United States Patent
Kurisaka

(10) Patent No.: US 9,970,341 B2
(45) Date of Patent: May 15, 2018

(54) EXHAUST PURIFICATION SYSTEM OF INTERNAL COMBUSTION ENGINE

(71) Applicant: Itsuya Kurisaka, Susono (JP)

(72) Inventor: Itsuya Kurisaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 14/117,549

(22) PCT Filed: Apr. 9, 2013

(86) PCT No.: PCT/JP2013/060740
§ 371 (c)(1),
(2) Date: Nov. 13, 2013

(87) PCT Pub. No.: WO2014/167652
PCT Pub. Date: Oct. 16, 2014

(65) Prior Publication Data
US 2016/0040570 A1 Feb. 11, 2016

(51) Int. Cl.
*F01N 3/00* (2006.01)
*F01N 3/025* (2006.01)
(Continued)

(52) U.S. Cl.
CPC ........... *F01N 3/0253* (2013.01); *F01N 3/035* (2013.01); *F01N 3/0814* (2013.01);
(Continued)

(58) Field of Classification Search
CPC ...... F01N 3/206; F01N 3/0253; F01N 3/0842; F01N 3/0814; F01N 9/002; F01N 2610/03
See application file for complete search history.

(56) References Cited

U.S. PATENT DOCUMENTS 6,988,361 B2 * 1/2006 van Nieuwstadt .... F01N 3/0842
60/274
8,341,939 B2 * 1/2013 Lee ......................... F01N 3/033
60/280
(Continued)

FOREIGN PATENT DOCUMENTS

JP  A-2002-349237   12/2002
JP  A-2005-16394    1/2005
(Continued)

OTHER PUBLICATIONS

U.S. Appl. No. 14/782,775 in the name of Yoshida filed Oct. 6, 2015.

*Primary Examiner* — Mark Laurenzi
*Assistant Examiner* — Jason Sheppard
(74) *Attorney, Agent, or Firm* — Oliff PLC

(57) ABSTRACT

In an internal combustion engine, an exhaust purification catalyst, hydrocarbon feed valve, and particulate filter are arranged in an exhaust passage. Hydrocarbons are injected from the hydrocarbon feed valve by a predetermined period so as to remove NOX which is contained in the exhaust gas in first NOX removal method. While doing this, the particulate matter which is trapped on the particulate filter is removed by raising the temperature of the particulate filter in temperature elevation control. At this time, the hydrocarbon injection for the first NOX removal method is performed by the predetermined period at the preset injection pressure. During the time period when the hydrocarbon injection for the first NOX removal method is not being performed, the hydrocarbon injection for the temperature elevation control is performed by an injection pressure which is set lower than the preset injection pressure.

17 Claims, 20 Drawing Sheets

(51) Int. Cl.
*F01N 3/08* (2006.01)
*F01N 9/00* (2006.01)
*F01N 3/035* (2006.01)
*F01N 3/20* (2006.01)

(52) U.S. Cl.
CPC ........... *F01N 3/0842* (2013.01); *F01N 3/206* (2013.01); *F01N 9/00* (2013.01); *F01N 9/002* (2013.01); *F01N 2610/03* (2013.01); *F01N 2900/1602* (2013.01); *F01N 2900/1808* (2013.01); *Y02T 10/47* (2013.01)

(56) References Cited

U.S. PATENT DOCUMENTS

| | | | |
|---|---|---|---|
| 8,776,503 B2 * | 7/2014 | Wang | .................... F01N 3/208 60/295 |
| 2012/0131908 A1 | 5/2012 | Bisaiji et al. | |
| 2013/0047588 A1 | 2/2013 | Inoue et al. | |
| 2013/0149198 A1 | 6/2013 | Urnemoto et al. | |
| 2013/0192212 A1 | 8/2013 | Umemoto et al. | |

FOREIGN PATENT DOCUMENTS

| | | |
|---|---|---|
| JP | 2009257209 A | 11/2009 |
| JP | A-2012-26406 | 2/2012 |
| WO | WO 2011/114499 A1 | 9/2011 |
| WO | WO 2012/029189 A1 | 3/2012 |
| WO | WO 2012/029190 A1 | 3/2012 |
| WO | WO 2013/031028 A1 | 3/2013 |

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine in which an exhaust purification catalyst is arranged inside an engine exhaust passage and a hydrocarbon feed valve is arranged upstream of the exhaust purification catalyst in the engine exhaust passage, a precious metal catalyst is carried on an exhaust gas flow surface of the exhaust purification catalyst and a basic exhaust gas flow surface part is formed around the precious metal catalyst, the exhaust purification catalyst has the property of reducing the $NO_X$ which is contained in the exhaust gas when making the concentration of hydrocarbons which flow into the exhaust purification catalyst vibrate by within a predetermined range of amplitude and within a predetermined range of period and has the property of being increased in amount of storage of $NO_X$ which is contained in the exhaust gas if making the vibration period of the hydrocarbon concentration longer than the predetermined range, and $NO_X$ which is contained in the exhaust gas is removed by injecting hydrocarbons from the hydrocarbon feed valve by a predetermined period in a first $NO_X$ removal method (for example, see PLT 1). In this internal combustion engine, further, a particulate filter for trapping particulate matter in the exhaust gas is arranged downstream of the exhaust purification catalyst in the engine exhaust passage.

On the other hand, known in the art is also an internal combustion engine which raises the temperature of the particulate filter under a lean air-fuel ratio in temperature elevation control, in order to remove the particulate matter which has been trapped on a particulate filter by oxidation. In the internal combustion engine which is described in PLT 1, the air-fuel ratio of the exhaust gas which flows into the particulate filter can made to become lean by injecting hydrocarbons from the hydrocarbon feed valve in temperature elevation control.

CITATIONS LIST

Patent Literature

PLT 1: WO2011/114499

SUMMARY OF INVENTION

Technical Problem

In this regard, to make the first $NO_X$ removal method more reliable, the concentration of hydrocarbons which flow into the exhaust purification catalyst has to be made to vibrate well. For this reason, it is necessary to inject hydrocarbons for the first $NO_X$ removal method from the hydrocarbon feed valve by a relatively high injection pressure.

On the other hand, the above-mentioned temperature elevation control is for example performed when the amount of particulate matter which is trapped on the particulate filter exceeds an allowable upper limit amount. For this reason, when the first $NO_X$ removal method is being performed and when the trapped amount of particulate matter exceeds the allowable upper limit amount, it is necessary to perform the first $NO_X$ removal method while performing temperature elevation control.

In this respect, in this case, if injecting hydrocarbons for temperature elevation control along with the hydrocarbons for the first $NO_X$ removal method, a large amount of hydrocarbons will be injected at a high injection pressure to the exhaust purification catalyst. As a result, part of the hydrocarbons is liable to slip through the exhaust purification catalyst and therefore the first $NO_X$ removal method is liable to become unable to be effectively performed. Further, the hydrocarbons which are injected from the hydrocarbon feed valve are difficult to disperse in the radial direction of the exhaust purification catalyst or particulate filter, so the temperature of the particulate filter is liable to become uneven. In this case, it is impossible to reliably remove the particulate matter on the particulate filter or an excessively large thermal reaction is liable to act on the particulate filter.

In this way, it is not possible to easily perform the first $NO_X$ removal method and temperature elevation control at the same time. PLT 1 does not allude at all on this point.

An object of the present invention is to provide an exhaust purification system of an internal combustion engine which can remove $NO_X$ well while performing good temperature elevation control.

Solution to Problem

According to the present invention, there is provided an exhaust purification system of an internal combustion engine in which an exhaust purification catalyst is arranged in an engine exhaust passage and a hydrocarbon feed value is arranged upstream of the exhaust purification catalyst in the engine exhaust passage, a precious metal catalyst is carried on an exhaust gas flow surface of the exhaust purification catalyst and a basic exhaust gas flow surface part is formed around the precious metal catalyst, the exhaust purification catalyst has the property of reducing the $NO_X$ which is contained in the exhaust gas when making the concentration of hydrocarbons which flow into the exhaust purification catalyst vibrate by within a predetermined range of amplitude and within a predetermined range of period and has the property of being increased in amount of storage of $NO_X$ which is contained in the exhaust gas if making the vibration period of the hydrocarbon concentration longer than the predetermined range, $NO_X$ which is contained in the exhaust gas is removed by injecting hydrocarbons from the hydrocarbon feed valve by a predetermined period in first $NO_X$ removal method, a particulate filter for trapping particulate matter in the exhaust gas is further arranged inside the engine exhaust passage, and, when performing the first $NO_X$ removal method while raising the temperature of the particulate filter so as to remove the particulate matter which was trapped on the particulate filter in temperature elevation control, the hydrocarbon injection for the first $NO_X$ removal method is performed by the predetermined period and by a preset injection pressure and, during the time period when the hydrocarbon injection for the first $NO_X$ removal method is not performed, the hydrocarbon injection for the temperature elevation control is performed by an injection pressure which is set lower than the preset injection pressure.

Advantageous Effects of Invention

It is possible to remove $NO_X$ well while performing excellent temperature elevation control.

DESCRIPTION OF EMBODIMENTS

Figure 1:
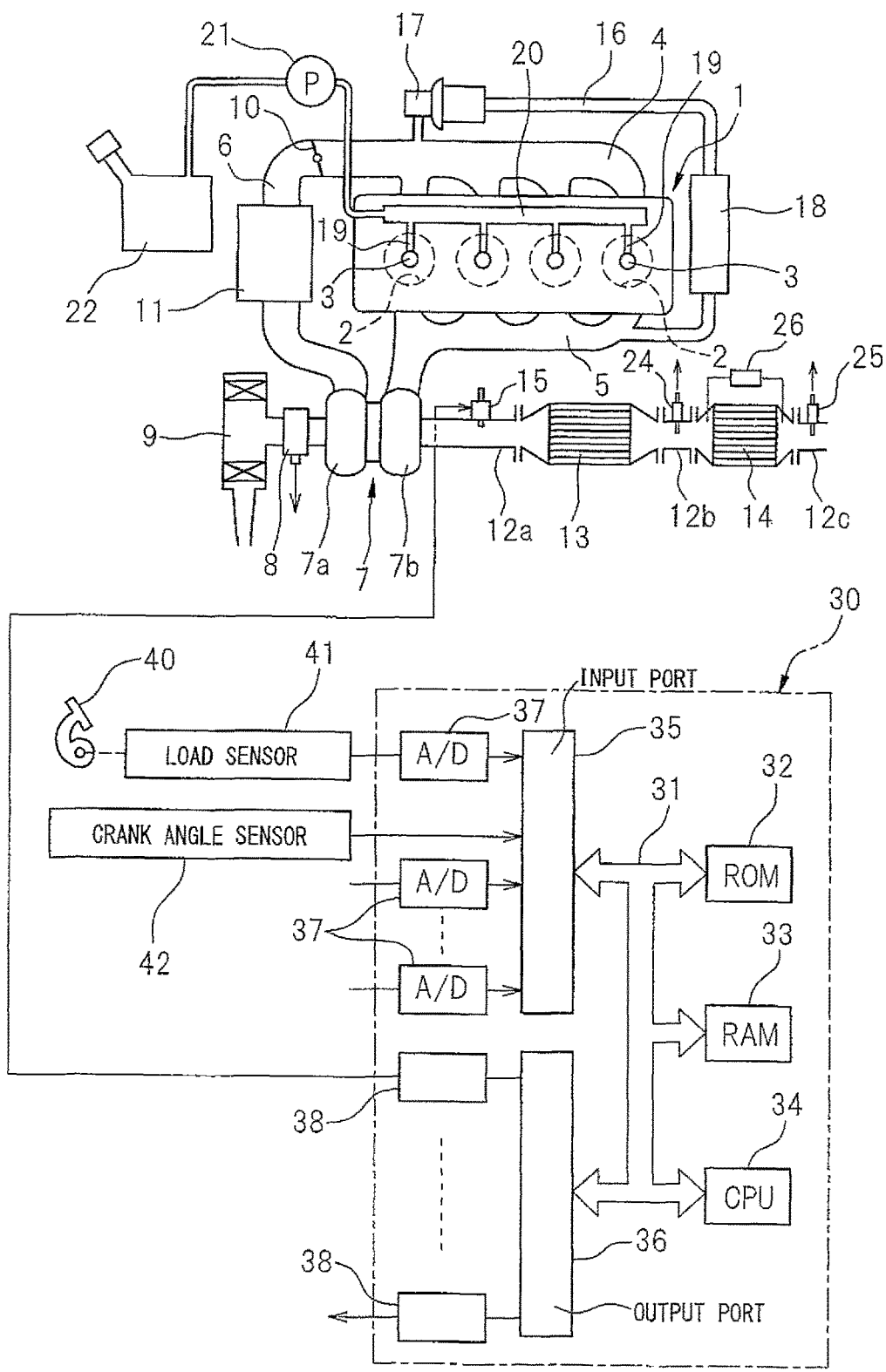
FIG. 1 is an overall view of a compression ignition type internal combustion engine.

FIG. 1 is an overall view of a compression ignition type internal combustion engine. Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12 to an inlet of the exhaust purification catalyst 13. In this embodiment according to the present invention, this exhaust purification catalyst 13 is comprised of an $NO_X$ storage catalyst. An outlet of the exhaust purification catalyst 13 is connected through the exhaust pipe 12b to the particulate filter 14. In another embodiment, the particulate filter 14 is arranged upstream of the exhaust purification catalyst 13. Upstream of the exhaust purification catalyst 13 inside the exhaust pipe 12a, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas which flows through the inside of the EGR passage 16. In the embodiment shown in FIG. 1, the engine cooling water is guided to the inside of the cooling device 18 where the engine cooling water is used to cool the EGR gas. Each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13 in the exhaust pipe 12b, a temperature sensor 24 for detecting the temperature of the exhaust gas which flows out from the exhaust purification catalyst 13 is attached. The temperature of the exhaust gas which is detected by the temperature sensor 24 expresses the temperature of the exhaust purification catalyst 13. Further, downstream of the particulate filter 14 in the exhaust pipe 12c, a temperature sensor 25 is attached for detecting the temperature of the exhaust gas which flows out from the particulate filter 14. The temperature of the exhaust gas which is detected by the temperature sensor 25 expresses the temperature of the particulate filter 14. Further, at the particulate filter 14, a differential pressure sensor 26 for detecting a differential pressure before and after the particulate filter 14 is attached. The output signals of these temperature sensors 24 and 25, differential pressure sensor 26, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, actuator for driving the throttle valve 10, hydrocarbon feed valve 15, EGR control valve 17, and fuel pump 21.

Figure 2:
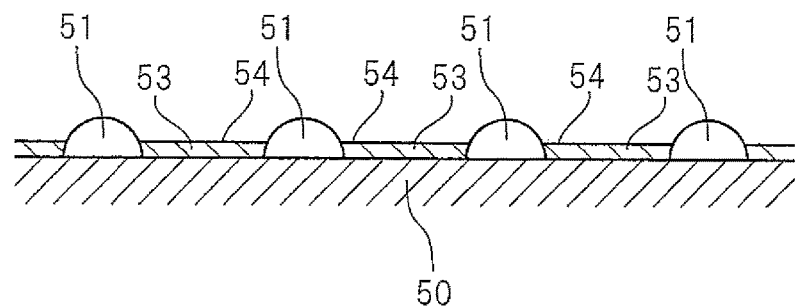
FIG. 2 is a view which schematically shows a surface part of a catalyst carrier.

FIG. 2 schematically shows a surface part of a catalyst carrier which is carried on a substrate of the exhaust purification catalyst 13 which is shown in FIG. 1. At this exhaust purification catalyst 13, as shown in FIG. 2, for example, a catalyst carrier 50 which is comprised of alumina carries a precious metal catalyst 51 which is comprised of platinum Pt. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. Inside of this basicity layer 53, ceria $CeO_2$ is contained. Therefore, the exhaust purification catalyst 13 has an oxygen storing ability. Further, the catalyst carrier 50 of the exhaust purification catalyst 13 can also carry rhodium Rh or palladium Pd in addition to platinum Pt. Note that the exhaust gas flows along the top of the catalyst carrier 50, so the precious metal catalyst 51 can be said to be carried on the exhaust gas flow surface of the exhaust purification catalyst 13. Further, the surface of the basic layer 53 exhibits basicity, so the surface of the basic layer 53 is called the "basic exhaust gas flow surface part 54."

Figure 3:
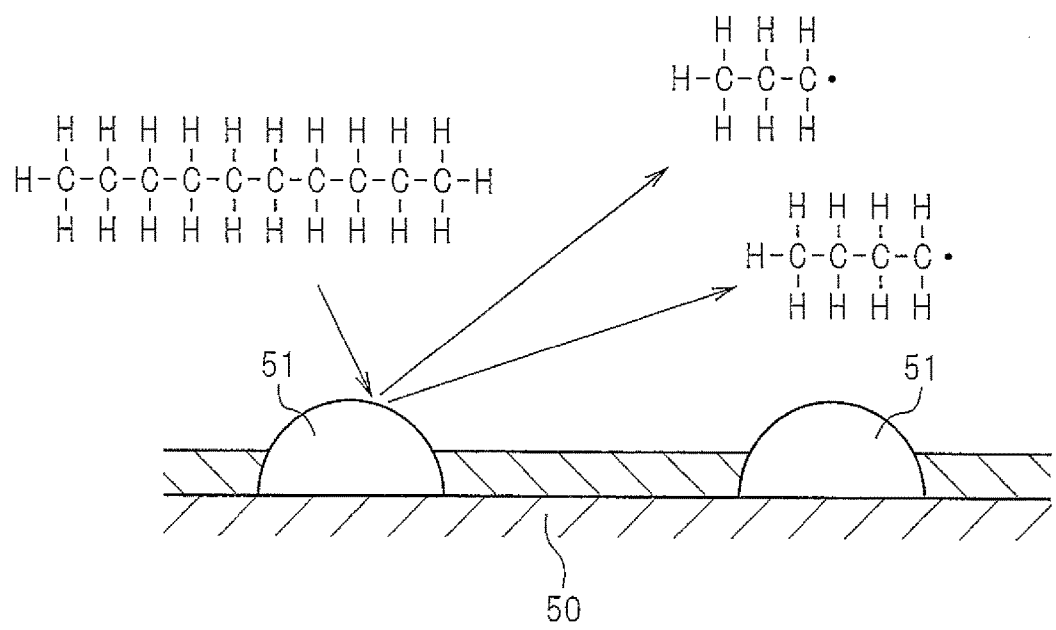
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Figure 4:
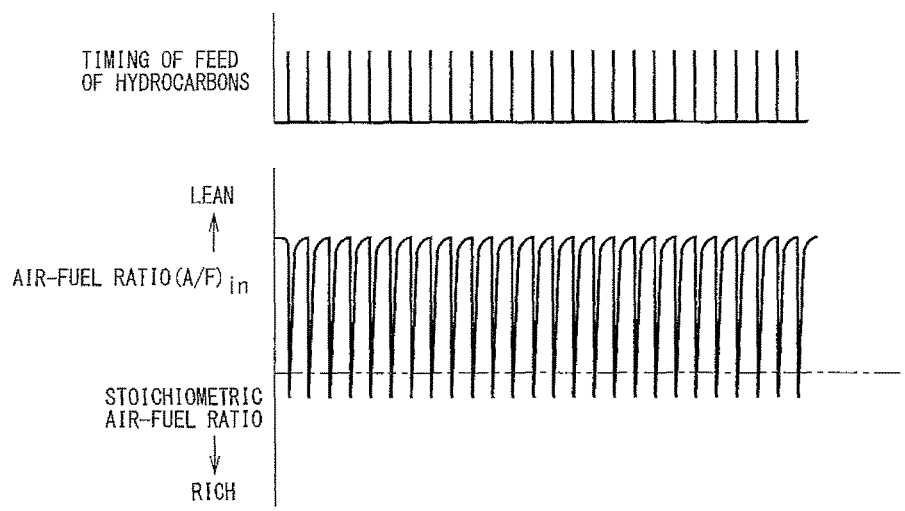
FIG. 4 is a view which shows a change of an air-fuel ratio of exhaust gas which flows into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
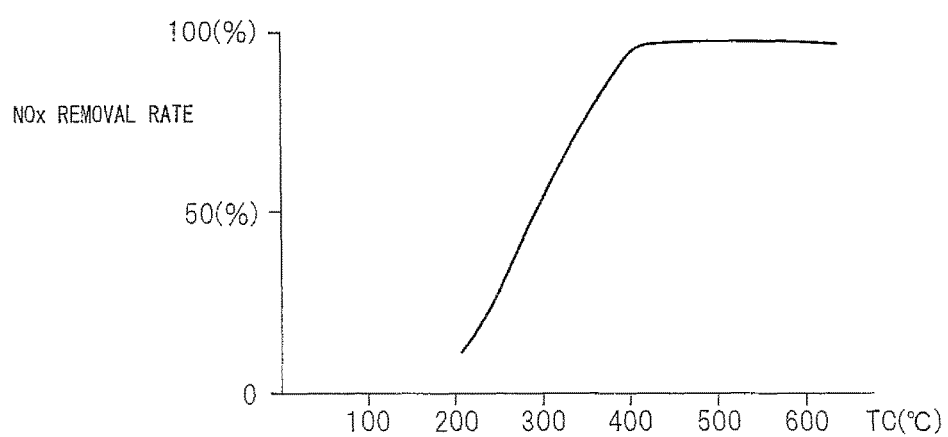
FIG. 5 is a view which shows an $NO_X$ removal rate.

FIG. 5 shows the NO removal rate by the exhaust purification catalyst 13 with respect to the catalyst temperatures of the exhaust purification catalyst 13 when periodically making the concentration of hydrocarbons which flow into the exhaust purification catalyst 13 change so as to, as shown in FIG. 4, make the air-fuel ratio (A/F)in of the exhaust gas which flows to the exhaust purification catalyst 13 change. The inventors engaged in research relating to $NO_x$ purification for a long time. As a result, they learned that if making the concentration of hydrocarbons which flow into the exhaust purification catalyst 13 vibrate by within a predetermined range of amplitude and within a predetermined range of period, as shown in FIG. 5, an extremely high $NO_x$ removal rate is obtained even in a 400° C. or higher high temperature region.

Figure 6A:
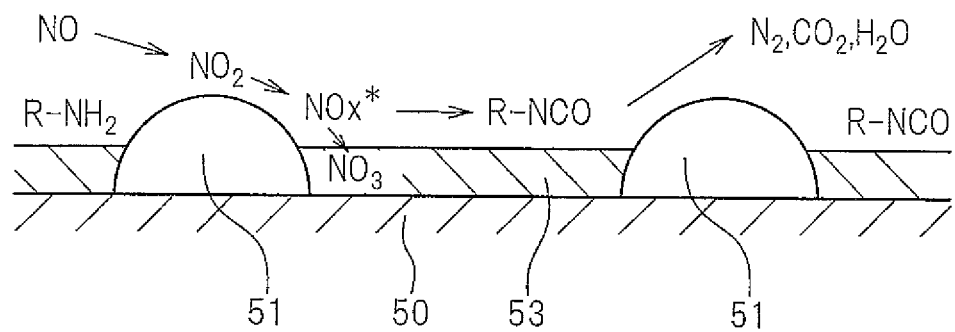
FIGS. 6A and 6B are views for explaining an oxidation reduction reaction in an exhaust purification catalyst.
Figure 6B:
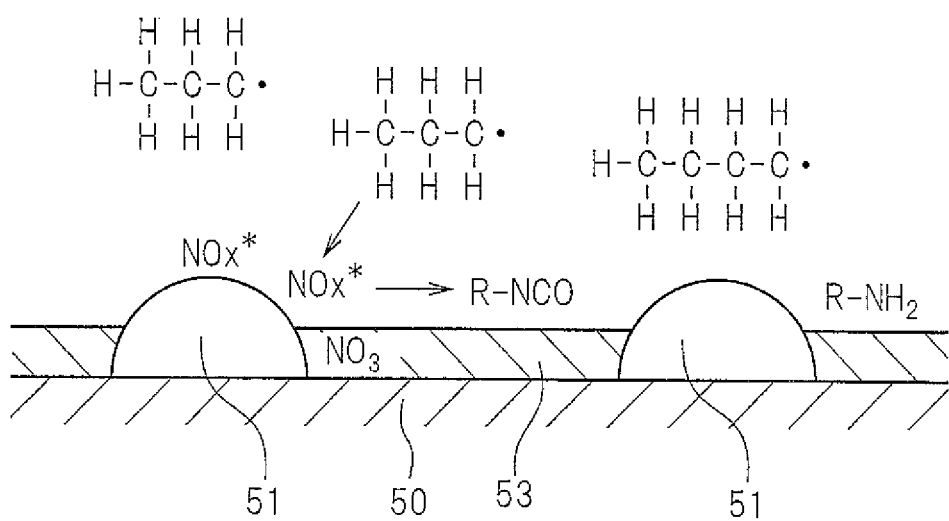

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ removal rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F)in of the exhaust gas which flows into the exhaust purification catalyst 13 is made rich, that is, when the concentration of hydrocarbons which flow into the exhaust purification catalyst 13 becomes high.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13 and part of the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. Therefore, on the platinum Pt 51, $NO_2^-$ and $NO_3$ are produced. The $NO_2^-$ and $NO_3$ which are produced on the NO and platinum Pt 51 which are deposited on the exhaust purification catalyst 13 are strong in activity. Therefore, below, these NO, $NO_2^-$, and $NO_3$ will be referred to as the active $NO_x^*$.

On the other hand, if hydrocarbons are fed from the hydrocarbon feed valve 15 and the air-fuel ratio (A/F)in of the exhaust gas which flows into the exhaust purification catalyst 13 is made rich, the hydrocarbons successively deposit across the exhaust purification catalyst 13 as a whole. The majority of the deposited hydrocarbons is successively reacted with the oxygen and made to burn, while part of the deposited hydrocarbons is successively, as shown in FIG. 3, reformed and becomes radicalized inside of the exhaust purification catalyst 13. Therefore, as shown in FIG. 6B, the hydrocarbon concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediate. This reducing intermediate is adhered or adsorbed on the surface of the basic layer 53.

Note that, at this time, the first produced reducing intermediate is considered to be a nitro compound $R—NO_2$. If this nitro compound $R—NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound $R—NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound $R—NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons which flow into the exhaust purification catalyst 13 is lowered and then the hydrocarbons which deposit around the reducing intermediate are oxidized and consumed and, due to this, the oxygen concentration around the reducing intermediate becomes higher, the reducing intermediate reacts with the $NO_X$ in the exhaust gas or the active $NO_X^*$ or reacts with the surrounding oxygen or breaks down on its own. Due to this, the reducing intermediate R—NCO or $R—NH_2$, as shown in FIG. 6A, is converted to $N_2$, $CO_2$, and $H_2O$ and therefore $NO_X$ is removed.

In this way, in the exhaust purification catalyst 13, by making the concentration of hydrocarbons which flow into the exhaust purification catalyst 13 higher, a reducing intermediate is produced. The concentration of hydrocarbons which flow into the exhaust purification catalyst 13 is lowered and the oxygen concentration is raised so that the reducing intermediate reacts with the $NO_X$ in the exhaust gas or the active $NO_X^*$ or oxygen or breaks down by itself whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the $NO_X$ in the exhaust gas or the active $NO_X^*$ and oxygen or for making it break down on its own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface part 54, until the produced reducing intermediate R—NCO or $R—NH_2$ reacts with the $NO_X$ in the exhaust gas or the active $NO_X^*$ or oxygen. For this reason, the basic exhaust gas flow surface part 54 is provided.

On the other hand, if lengthening the feed period of the hydrocarbons, the time period in which the oxygen concentration becomes higher becomes longer in the period after the hydrocarbons are fed until the hydrocarbons are next fed. Therefore, the active $NO_X^*$ is absorbed in the basic layer 53 in the form of nitrates without producing a reducing intermediate. To avoid this, it is necessary to make the concentration of hydrocarbons which flow into the exhaust purification catalyst 13 vibrate by within a predetermined range of period.

Therefore, in an embodiment of the present invention, to make the $NO_X$ which is contained in the exhaust gas and the reformed hydrocarbons react and produce the reducing intermediate R—NCO or $R—NH_2$ containing nitrogen and hydrocarbons, a precious metal catalyst 51 is carried on the exhaust gas flow surface of the exhaust purification catalyst 13. To hold the produced reducing intermediate R—NCO or $R—NH_2$ inside the exhaust purification catalyst 13, a basic exhaust gas flow surface part 54 is formed around the precious metal catalyst 51. The reducing intermediate R—NCO or $R—NH_2$ which is held on the basic exhaust gas flow surface part 54 is converted to $N_2$, $CO_2$, and $H_2O$, and the vibration period of the hydrocarbon concentration is made the vibration period required for continuation of the production of the reducing intermediate R—NCO or $R—NH_2$. Incidentally, in the example shown in FIG. 4, the injection interval is made 3 seconds.

Figure 7A:
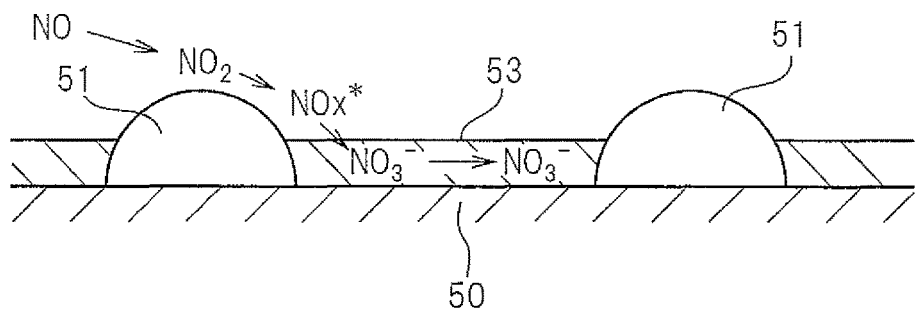
FIGS. 7A and 7B are views for explaining an oxidation reduction reaction in an exhaust purification catalyst.

If the vibration period of the hydrocarbon concentration, that is, the injection period of the hydrocarbons HC from the hydrocarbon feed valve 15, is made longer than the above predetermined range of period, the reducing intermediate R—NCO or $R—NH_2$ disappears from the surface of the basic layer 53. At this time, the active $NO_X^*$ which is produced on the platinum Pt 53, as shown in FIG. 7A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 7B:
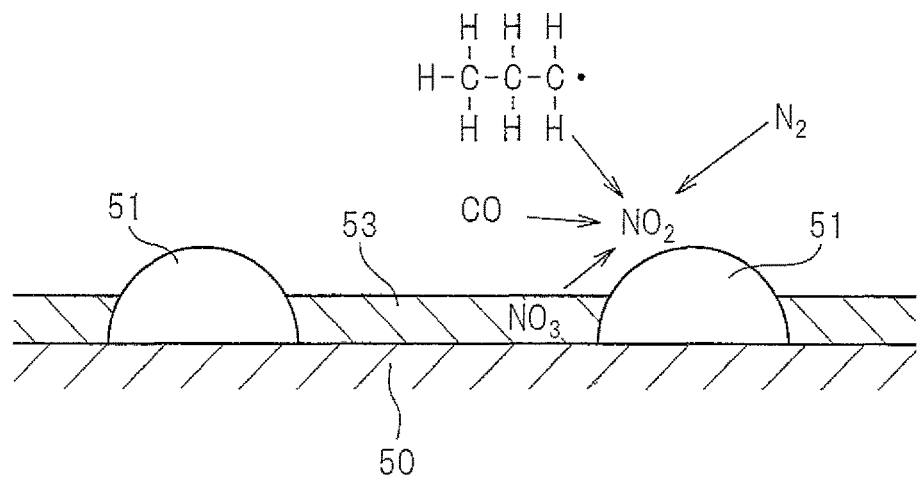

On the other hand, FIG. 7B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
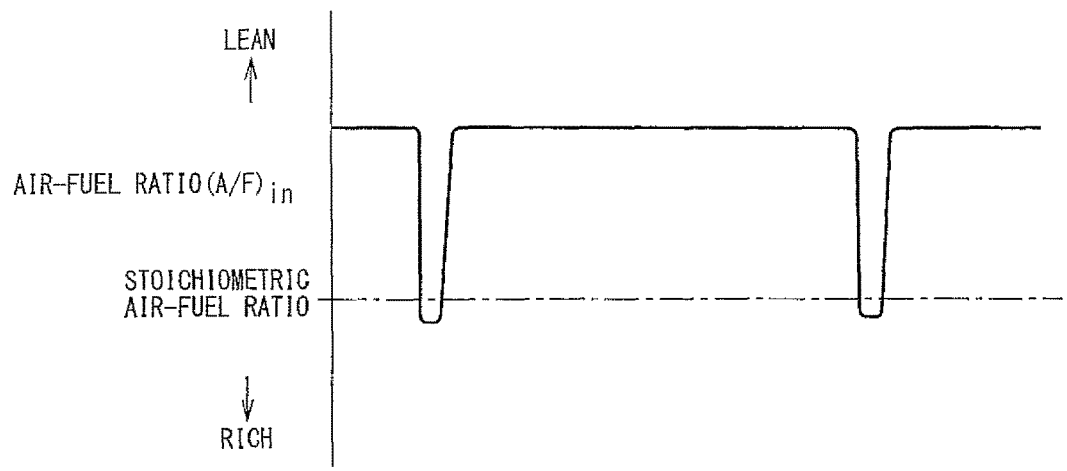
FIG. 8 is a view which shows a change of an air-fuel ratio of exhaust gas which flows into an exhaust purification catalyst.

FIG. 8 shows the case of making the air-fuel ratio (A/F)in of the exhaust gas which flows into the exhaust purification catalyst 13 temporarily rich slightly before the $NO_X$ absorption ability of the basic layer 53 becomes saturated. Note that, in the example shown in FIG. 8, the time interval of this rich control is 1 minute or more. In this case, the $NO_X$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using the term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and exhaust passage upstream of the exhaust purification catalyst 13 is referred to as "the air-fuel ratio of the exhaust gas", the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
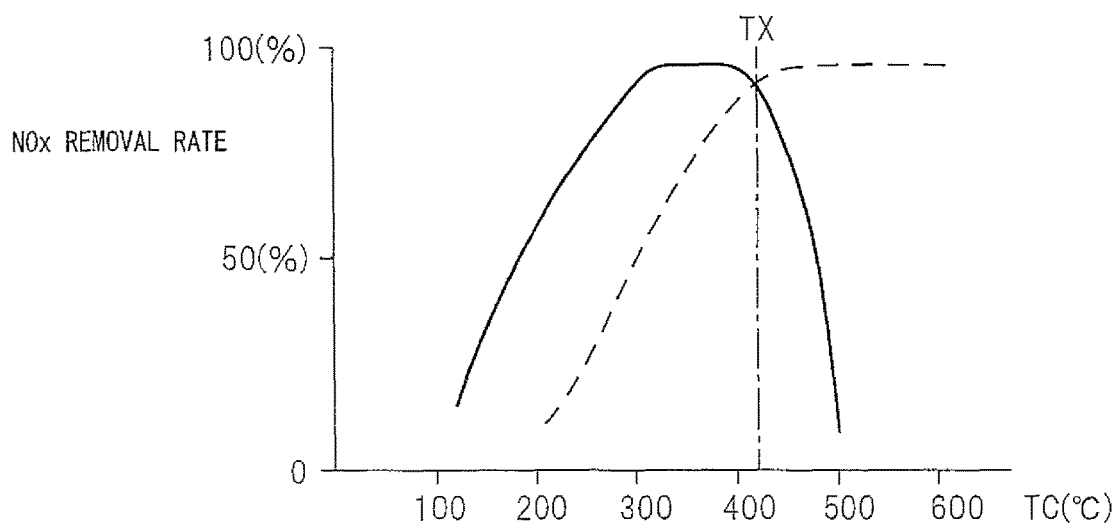
FIG. 9 is a view of an $NO_X$ removal rate.

In FIG. 9, the solid line shows the $NO_x$ removal rate when making the exhaust purification catalyst 13 function as an $NO_x$ storage catalyst in this way. Note that, in FIG. 9, the abscissa shows the catalyst temperature TC of the exhaust purification catalyst 13. When making the exhaust purification catalyst 13 function as an $NO_x$ storage catalyst in this way, as shown in FIG. 9 by the solid line, when the catalyst temperature TC is 300° C. to 400° C., an extremely high $NO_x$ removal rate is obtained, but when the catalyst temperature TC becomes a 400° C. or higher high temperature, the $NO_x$ removal rate falls. Note that FIG. 9 shows the $NO_X$ removal rate which is shown in FIG. 5 by a broken line.

In this way, when the catalyst temperature TC becomes 400° C. or more, the $NO_x$ removal rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ removal rate. However, in the new $NO_X$ removal method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ removal rate is obtained.

In this embodiment of the present invention, to use this new $NO_X$ removal method to remove $NO_X$, a hydrocarbon feed valve 15 for feeding hydrocarbons is arranged inside of an engine exhaust passage, an exhaust purification catalyst 13 is arranged downstream of the hydrocarbon feed valve 15 in the engine exhaust passage, a precious metal catalyst 51 is carried on the exhaust gas flow surface of the exhaust purification catalyst 13, a basic exhaust gas flow surface part 54 is formed around the precious metal catalyst 51, the exhaust purification catalyst 13 has the property of reducing the $NO_x$ which is contained in exhaust gas if the concentration of hydrocarbons which flow into the exhaust purification catalyst 13 is made to vibrate within a predetermined range of amplitude and within a predetermined range of period and has the property of being increased in storage amount of $NO_x$ which is contained in exhaust gas if the vibration period of the hydrocarbon concentration is made longer than this predetermined range, and, at the time of engine operation, hydrocarbons are injected by a predetermined period to thereby reduce the $NO_x$ which is contained in the exhaust gas in the exhaust purification catalyst 13.

That is, the $NO_X$ removal method which is shown from FIG. 4 to FIGS. 6A and 6B can be said to be a new $NO_X$ removal method designed to remove $NO_x$ without forming almost any nitrates in the case of using an exhaust purification catalyst which carries a precious metal catalyst and forms a basic layer which can absorb $NO_x$. In actuality, when using this new $NO_X$ removal method, the nitrates which are detected from the basic layer 53 become much smaller in amount compared with the case where making the exhaust purification catalyst 13 function as an $NO_x$ storage catalyst. Note that, this new $NO_X$ removal method will be referred to below as "the first $NO_X$ removal method".

Figure 10:
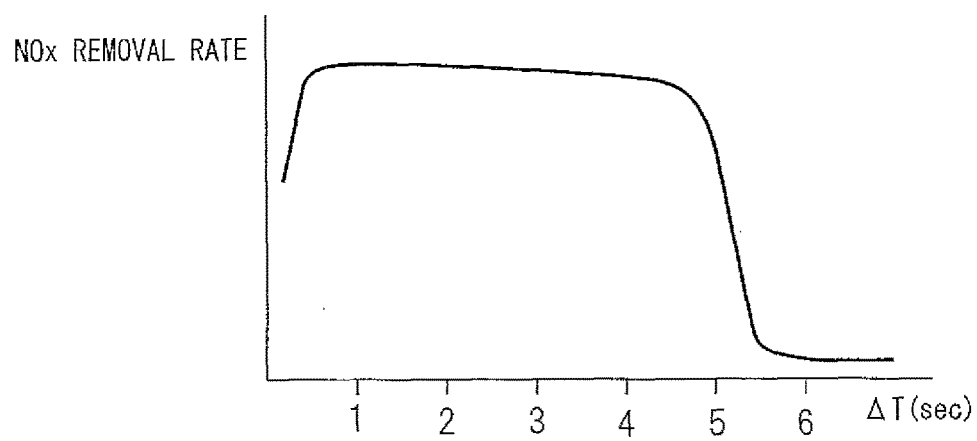
FIG. 10 is a view which shows a relationship between an injection period ΔT of hydrocarbons and an $NO_X$ removal rate.

Now, as explained above, if the injection period $\Delta T$ of the hydrocarbons from the hydrocarbon feed valve 15 becomes longer, the time period during which the oxygen concentration around the active $NO_x^*$ becomes higher becomes longer in the period after the hydrocarbons are injected to when the hydrocarbons are next injected. In this case, in the embodiment which is shown in FIG. 1, if the injection period $\Delta T$ of the hydrocarbons becomes longer than about 5 seconds, the active $NO_x^*$ starts to be absorbed in the form of nitrates inside the basic layer 53. Therefore, as shown in FIG. 10, if the vibration period $\Delta T$ of the hydrocarbon concentration becomes longer than about 5 seconds, the $NO_x$ removal rate falls. Therefore, in the embodiment which is shown in FIG. 1, the injection period $\Delta T$ of the hydrocarbons has to be made 5 seconds or less.

On the other hand, in this embodiment according to the present invention, if the injection period $\Delta T$ of the hydrocarbons becomes about 0.3 second or less, the fed hydrocarbons start to build up on the exhaust gas flow surface of the exhaust purification catalyst 13, therefore, as shown in FIG. 10, if the injection period $\Delta T$ of the hydrocarbons becomes about 0.3 second or less, the $NO_x$ removal rate falls. Therefore, in this embodiment of the present invention, the injection period of the hydrocarbons is made from 0.3 second to 5 seconds.

Figure 11:
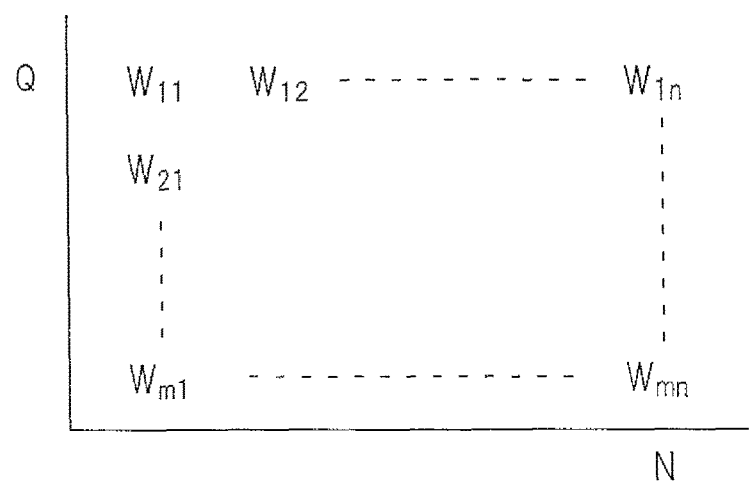
FIG. 11 is a map which shows an injection amount of hydrocarbons.

Now, in this embodiment according to the present invention, control is performed to change the amount of hydrocarbon injection from the hydrocarbon feed valve 15 and the injection timing so that the air-fuel ratio (A/F)in of the exhaust gas which flows into the exhaust purification catalyst 13 and the injection period $\Delta T$ become the optimum values in accordance with the operating state of the engine. In this case, in this embodiment according to the present invention, the optimum hydrocarbon injection amount W when the $NO_X$ removal action by the first $NO_X$ removal method is being performed is stored as a function of the amount of depression L of the accelerator pedal 40 and the engine speed N in the form of a map such as shown in FIG. 11 in advance in the ROM 32. Further, the optimum injection period $\Delta T$ of the hydrocarbons at this time is also stored as a function of the amount of depression L of the accelerator pedal 40 and the engine speed N in the form of a map in advance in the ROM 32.

Next, while referring to FIG. 12 to FIG. 15, the $NO_X$ removal method in the case of making the exhaust purification catalyst 13 function as an $NO_X$ storage catalyst will be specifically explained. The $NO_X$ removal method in the case of making the exhaust purification catalyst 13 function as an $NO_X$ storage catalyst in this way will be referred to below as "the second $NO_X$ removal method".

Figure 12:
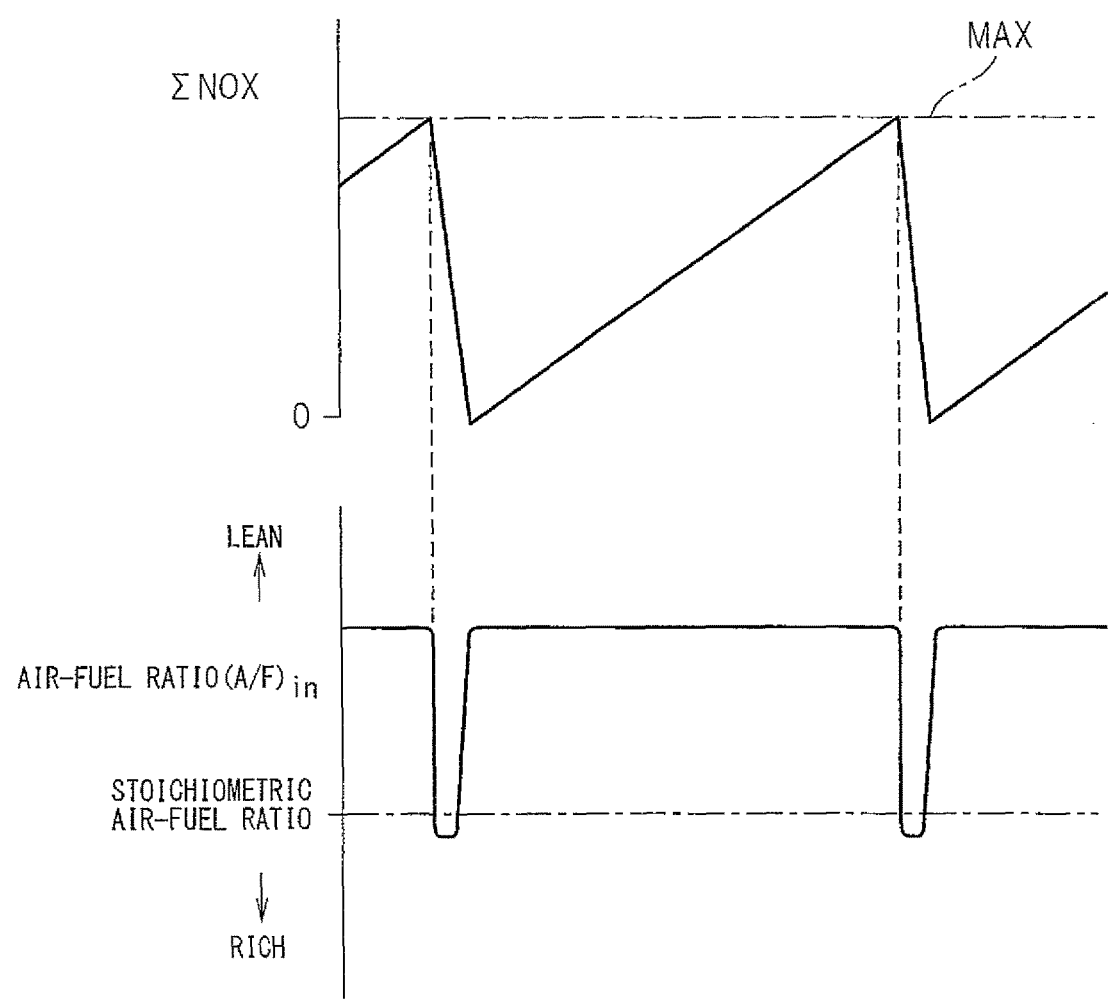
FIG. 12 is a view which shows $NO_X$ release control.

In this second $NO_X$ removal method, as shown in FIG. 12, when the stored $NO_X$ amount $\Sigma NOX$ which was stored in the basicity layer 53 exceeds a predetermined allowable amount MAX, the air-fuel ratio (A/F)in of the exhaust gas which flows into the exhaust purification catalyst 13 is temporarily made rich. If the air-fuel ratio (A/F)in of the exhaust gas is made rich, when the air-fuel ratio (A/F)in of the exhaust gas is lean, the $NO_X$ which was stored in the basicity layer 53 is released all at once from the basicity layer 53 and reduced. Due to this, the $NO_X$ is removed.

Figure 13:
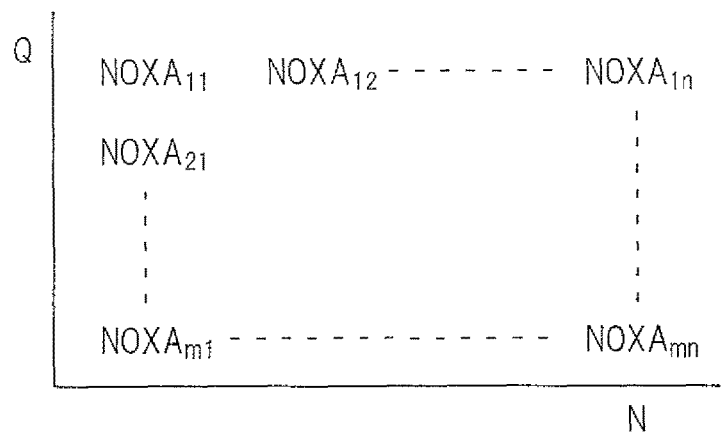
FIG. 13 is a view which shows a map of an exhausted $NO_X$ amount NOXA.

The stored $NO_X$ amount ΣNOX is for example calculated from the amount of $NO_X$ which is exhausted from the engine. In this embodiment according to the present invention, the exhausted $NO_X$ amount NOXA which is exhausted from the engine per unit time is stored as a function of the amount of depression L of the accelerator pedal 4 and the engine speed N in the form of a map such as shown in FIG. 13 in advance in the ROM 32. The stored $NO_X$ amount ΣNOX is calculated from this exhausted $NO_X$ amount NOXA. In this case, as explained above, the period by which the air-fuel ratio (A/F)in of the exhaust gas is made rich is usually 1 minute or more.

Figure 14:
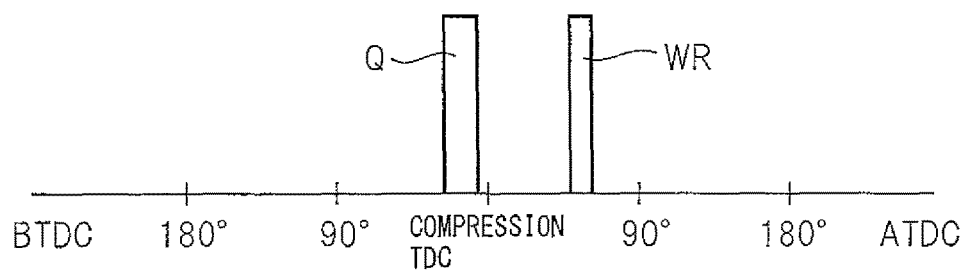
FIG. 14 is a view which shows a fuel injection timing.
Figure 15:
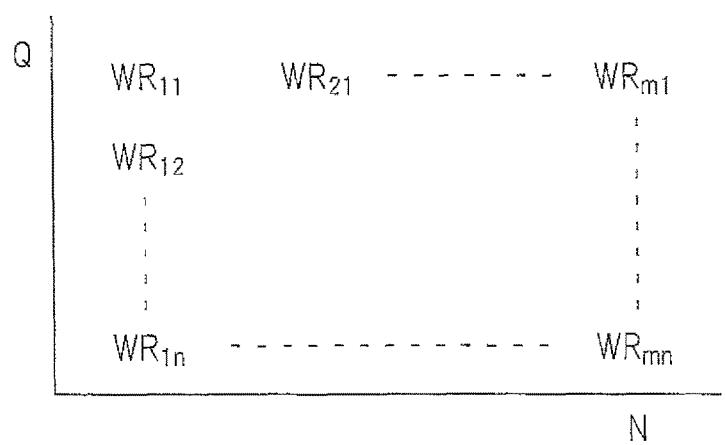
FIG. 15 is a view which shows a map of a fuel feed amount WR.

In this second $NO_X$ removal method, as shown in FIG. 14, in addition to the combustion use fuel Q from the fuel injector 2, additional fuel WR is injected into the combustion chamber 2 so that the air-fuel ratio (A/F)in of the exhaust gas which flows into the exhaust purification catalyst 13 is made rich. Note that, in FIG. 14, the abscissa shows the crank angle. This additional fuel WR is injected at a timing at which it burns, but does not appear as engine output, that is, slightly before ATDC90° after top dead center of the compression stroke. This fuel amount WR is stored as a function of the amount of depression L of the accelerator pedal 40 and the engine speed N in the form of a map such as shown in FIG. 15 in advance in the ROM 32. Of course, in this case, it is also possible to make the amount of injection of hydrocarbons from the hydrocarbon feed valve 15 increase so as to make the air-fuel ratio (A/F)in of the exhaust gas rich.

Now then, in this embodiment according to the present invention, the $NO_X$ removal action by the first $NO_X$ removal method and the $NO_X$ removal action by the second $NO_X$ removal method are selectively performed. Which of the $NO_X$ removal action by the first $NO_X$ removal method and the $NO_X$ removal action by the second $NO_X$ removal method to perform is determined for example as follows. That is, the $NO_X$ removal rate when the $NO_X$ removal action by the first $NO_X$ removal method is performed, as shown in FIG. 9 by the broken line, starts to rapidly fall when the temperature TC of the exhaust purification catalyst 13 becomes the limit temperature TX or less. As opposed to this, as shown in FIG. 9 by the solid line, the $NO_X$ removal rate when the $NO_X$ removal action by the second $NO_X$ removal method is performed falls relatively slowly when the temperature TC of the exhaust purification catalyst 13 falls. Therefore, in this embodiment according to the present invention, when the temperature TC of the exhaust purification catalyst 13 is higher than the limit temperature TX, the $NO_X$ removal action by the first $NO_X$ removal method is performed, while when the temperature TC of the exhaust purification catalyst 13 is lower than the limit temperature TX, the $NO_X$ removal action by the second $NO_X$ removal method is performed.

Figure 16:
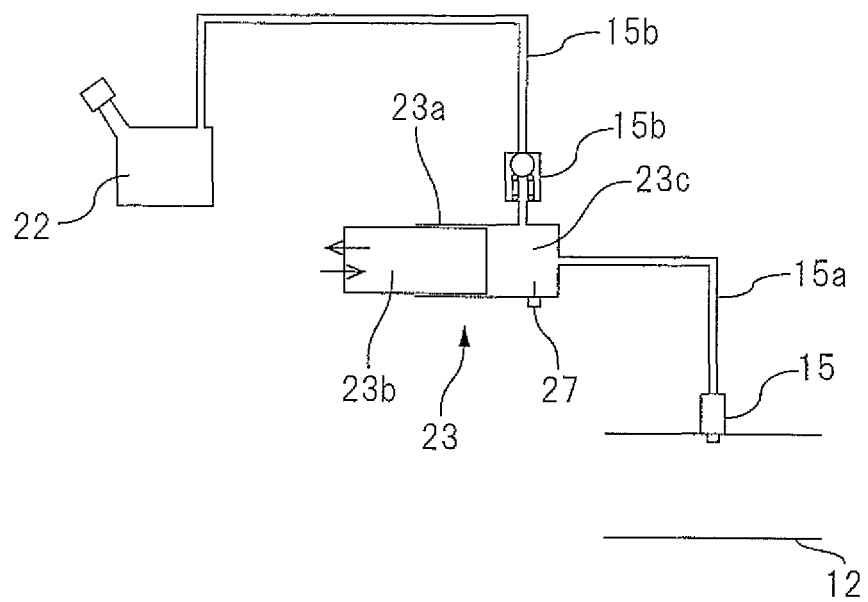
FIG. 16 is an enlarged view of the surroundings of a hydrocarbon feed valve.

In this regard, in this embodiment according to the present invention, as explained above, as the hydrocarbons which are fed from the hydrocarbon feed valve 15, diesel oil, that is, engine fuel, is used. For this reason, as shown in FIG. 16, the hydrocarbon feed valve 15 is connected through a hydrocarbon pipe 15a to an outlet of a hydrocarbon pump 23, while an inlet of the hydrocarbon pump 23 is connected through a hydrocarbon pipe 15b to a fuel tank 22. The hydrocarbon pipe 15b is provided with a check valve 15b which allows the flow of hydrocarbons from the fuel tank 22 to only the hydrocarbon pump 23.

The hydrocarbon pump 23 is provided with a housing 23a and a plunger 23b which moves back and forth inside of the housing 23a. Between the housing 23a and the plunger 23b, a pressure storage chamber 23c is formed. The inlet and outlet of the hydrocarbon pump 23 are connected to this pressure storage chamber 23c. Therefore, the fuel inside of the fuel tank 22 is connected through the pressure storage chamber 34 of the hydrocarbon pump 15 to the hydrocarbon feed valve 15.

Figure 17:
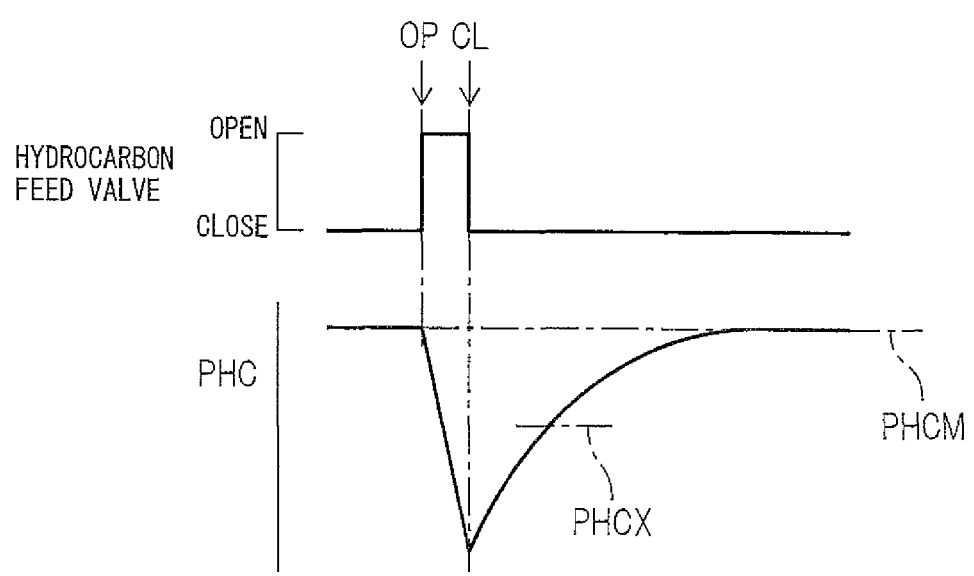
FIG. 17 is a time chart which shows a change in pressure inside a pressure storage chamber.

As shown in FIG. 17 by the arrow OP, if the hydrocarbon feed valve 15 is opened and hydrocarbons are injected, the pressure PHC inside of the pressure storage chamber 23c rapidly falls from the maximum pressure PHCM. Next, as shown by the arrow CL, if the hydrocarbon feed valve 15 is closed, the pressure PHC inside of the pressure storage chamber 34c gradually rises. In this case, the pressure PHC inside of the pressure storage chamber 23c draws a projecting curve together with the elapse of time. Therefore, the rate of rise of the pressure PHC inside of the pressure storage chamber 23c falls as the elapsed time from the previous hydrocarbon injection becomes longer. Next, when the pressure PHC inside of the pressure storage chamber 23c reaches the maximum pressure PHCM, the pressure PHC is maintained at the maximum pressure PHCM. On the other hand, the pressure PHC inside of the pressure storage chamber 23C expresses the injection pressure of the hydrocarbon feed valve 15. Therefore, the injection pressure of the hydrocarbon feed valve 15 rises the longer the elapsed time from the previous hydrocarbon injection and is maintained at the maximum pressure PHCM when it is reached at the maximum pressure PHCM. The rate of rise of the injection pressure falls the longer the elapsed time from the previous hydrocarbon injection.

Figure 18:
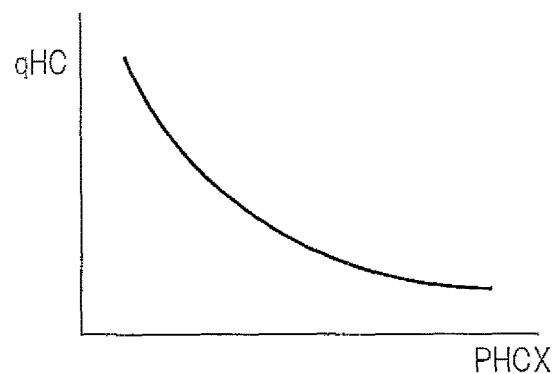
FIG. 18 is a graph which shows a relationship between an injection pressure PHCX and a hydrocarbon amount qHC which is injected from a hydrocarbon feed valve per unit.

As a result, when repeatedly injecting hydrocarbons from the hydrocarbon feed valve 15 each time the injection pressure of the hydrocarbon feed valve 15 reaches PHCX in the state where the injection time of the hydrocarbons is maintained constant, the amount of hydrocarbons which is injected from the hydrocarbon feed valve 15 per unit time, that is, the total amount of hydrocarbons qHC which is injected from the hydrocarbon feed valve 15 during a constant time period, becomes greater as the injection pressure PHCX becomes smaller as shown in FIG. 18.

In this regard, the exhaust gas contains particulate matter which is mainly comprised of solid carbon. If the exhaust gas flows inside the particulate filter 14, the particulate matter is trapped on the particulate filter 14. On the other hand, in the combustion chamber 2, fuel is burned under an oxygen excess. Therefore, so long as fuel is not secondarily fed from the fuel injector 3 and hydrocarbon feed valve 15, the particulate filter 14 is in an oxidizing atmosphere. Further, the particulate filter 14 carries a catalyst which has an oxidation function. As a result, the particulate matter which is trapped on the particulate filter 14 is successively oxidized. In this regard, if the amount of particulate matter which is trapped per unit time becomes greater than the amount of particulate matter which is oxidized per unit time, the amount of particulate matter which is trapped on the particulate filter 14 increases along with the elapse of the engine operating time. As a result, the pressure loss of the particulate filter 14 becomes greater and the engine back pressure ends up becoming larger.

Therefore, in this embodiment according to the present invention, it is judged if the amount of trapped particulate matter on the particulate filter 14 is greater than the allowable upper limit amount. When it is judged that the amount of trapped particulate matter is greater than the allowable upper limit amount, to remove the particulate matter from the particulate filter 14, the temperature of the particulate filter 14 is raised to and maintained at a predetermined set temperature or more under a lean air-fuel ratio in temperature elevation control. This set temperature is the temperature at which the particulate matter can be oxidized, for example, 600° C. As a result, the particulate matter is oxidized and removed from the particulate filter 14. Note that, in this embodiment according to the present invention, when the differential pressure before and after the particulate filter 14 is higher than the allowable upper limit, it is judged that the amount of trapped particulate matter on the particulate filter 14 is greater than the allowable upper limit amount.

In this embodiment according to the present invention, for temperature elevation control, hydrocarbons are injected from the hydrocarbon feed valve 15 so that the air-fuel ratio of the exhaust gas which flows into the particulate filter 14 becomes lean. That is, the injected hydrocarbons burn in the exhaust purification catalyst 13, the temperature of the exhaust gas which flows into the particulate filter 14 rises, and as a result the temperature of the particulate filter 14 is raised. Alternatively, the injected hydrocarbons are burned at the particulate filter 14 and as a result the temperature of the particulate filter 14 is raised. Note that, in this embodiment according to the present invention, the air-fuel ratio of the exhaust gas which flows into the particulate filter 14 matches the air-fuel ratio (A/F)in of the exhaust gas which flows into the exhaust purification catalyst 13.

This being so, in this embodiment according to the present invention, hydrocarbons are injected from the hydrocarbon feed valve 15 when the first $NO_X$ removal method should be performed without performing temperature elevation control, when the temperature elevation control should be performed without performing the first $NO_X$ removal method, and when temperature elevation control should be performed while performing the first $NO_X$ removal method.

Figure 19:
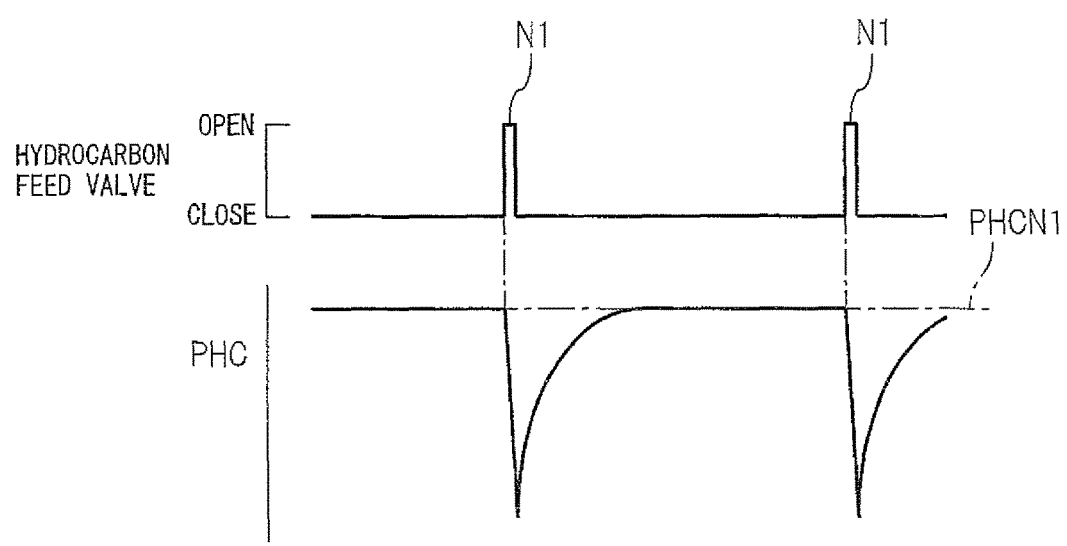
FIG. 19 is a time chart which explains a hydrocarbon injection action in the case where a first $NO_X$ removal method is performed.

FIG. 19 shows the case when the first $NO_X$ removal method should be performed without performing temperature elevation control. In FIG. 19, N1 indicates the hydrocarbon injection for the first $NO_X$ removal method. In this case, the injection pressure of the hydrocarbon feed valve 15 is set to an injection pressure PHCN1 which is set to the high pressure side. Hydrocarbons are injected from the hydrocarbon feed valve 15 by the above-mentioned period ΔT. In this embodiment according to the present invention, the injection pressure PHCN1 is set to the maximum pressure PHCM which was explained with reference to FIG. 17. If performing hydrocarbon injection by the injection pressure PHCN1 which is set to the high pressure side in this way, the concentration of hydrocarbons which flow into the exhaust purification catalyst 13 can be made to vibrate well. Therefore, good $NO_X$ removal can be performed.

Figure 20:
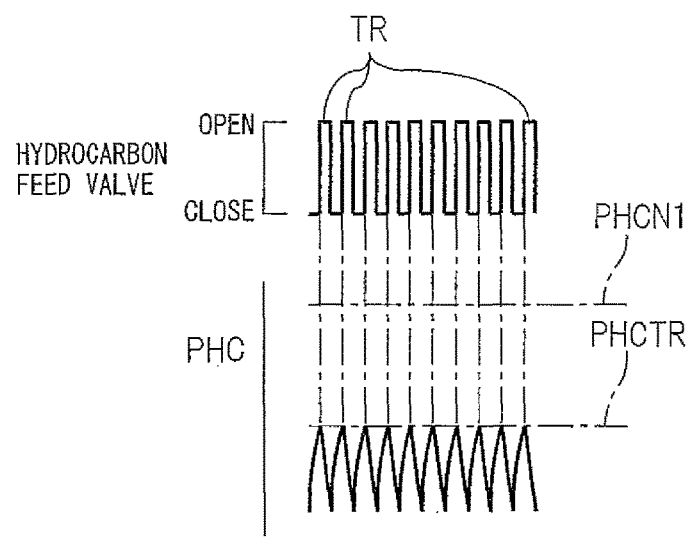
FIG. 20 is a time chart which explains a hydrocarbon injection action in the case where temperature elevation control is performed.

FIG. 20 shows the case where temperature elevation control should be performed without performing the first $NO_X$ removal method, that is, where temperature elevation control should be performed while performing the second $NO_X$ removal method. In FIG. 20, TR shows the hydrocarbon injection for temperature elevation control. In this case, the injection pressure of the hydrocarbon feed valve 15 is set to the injection pressure PHCTR which has been set to the low pressure side. Each time the pressure PHC inside of the pressure storage chamber 23c reaches the injection pressure PHCTR, hydrocarbons are injected from the hydrocarbon feed valve 15. If performing hydrocarbon injection by the injection pressure PHCTR which is set to the low pressure side in this way, the injected hydrocarbons disperse well in the radial direction of the exhaust purification catalyst 13 or the particulate filter 14 and as a result the temperature of the particulate filter 14 can be kept from becoming uneven. Further, it is possible to suppress pulsation of the temperature of the particulate filter 14. Therefore, good temperature elevation control can be performed.

Figure 21:
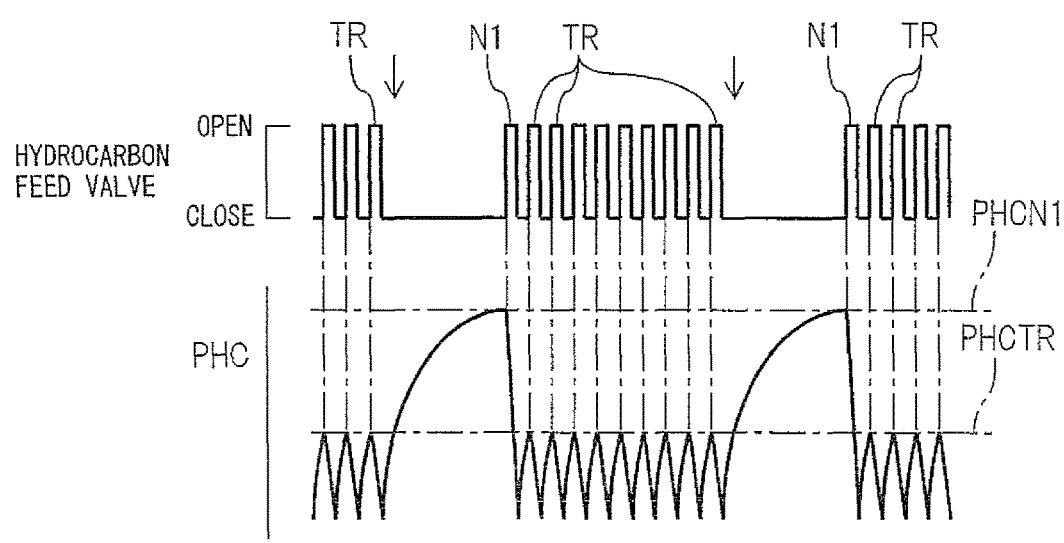
FIG. 21 is a time chart which explains a hydrocarbon injection action in the case where a first $NO_X$ removal method is performed while temperature elevation control is performed.

FIG. 21 shows the case of performing the first $NO_X$ removal method while performing temperature elevation control. In FIG. 21, N1 indicates the hydrocarbon injection for the first $NO_X$ removal method while TR indicates the hydrocarbon injection for temperature elevation control. In this case, the hydrocarbon injection for the first $NO_X$ removal method is performed by the above-mentioned period ΔT and a relatively high injection pressure PHCN1. In this case, hydrocarbon injection is performed so that the air-fuel ratio (A/F)in of the exhaust gas becomes rich. Further, during the time period where the hydrocarbon injection for the first $NO_X$ removal method is not performed, that is, the time period from the previous hydrocarbon injection for the first $NO_X$ removal method to the next hydrocarbon injection for the first $NO_X$ removal method, the hydrocarbon injection for the temperature elevation control is performed by an injection pressure PHCTR which is set to the low pressure side. In this case, hydrocarbon injection is performed so that the air-fuel ratio (A/F)in of the exhaust gas is maintained lean. As a result, good $NO_X$ removal can be performed while good temperature elevation control is performed.

Note that, in FIG. 21, the arrow shows the timing when a signal is output for performing hydrocarbon injection for the first $NO_X$ removal method. If this signal is output, even if the pressure PHC inside of the pressure storage chamber 23c reaches the injection pressure PHCTR which is set to the low pressure side, hydrocarbon injection for temperature elevation control is not performed. Therefore, the pressure PHC inside of the pressure storage chamber 23c can be raised to the maximum pressure PHCM.

Therefore, when temperature elevation control should be performed to raise the temperature of the particulate filter 14 so as to remove the particulate matter which has been trapped on the particulate filter 14 while performing the first $NO_X$ removal method, hydrocarbon injection for the first $NO_X$ removal method is performed with a predetermined period and at a preset injection pressure PHCN1, while during the time period when hydrocarbon injection for the first $NO_X$ removal method is not performed, hydrocarbon injection for the temperature elevation control is performed by an injection pressure PHCTR which is set lower than the set injection pressure PHCN1.

Referring to FIG. 19 from FIG. 21, it is also possible to view the period of the hydrocarbon injection TR for the temperature elevation control as being set shorter than the period of the hydrocarbon injection for the first $NO_X$ removal method.

Figure 22:
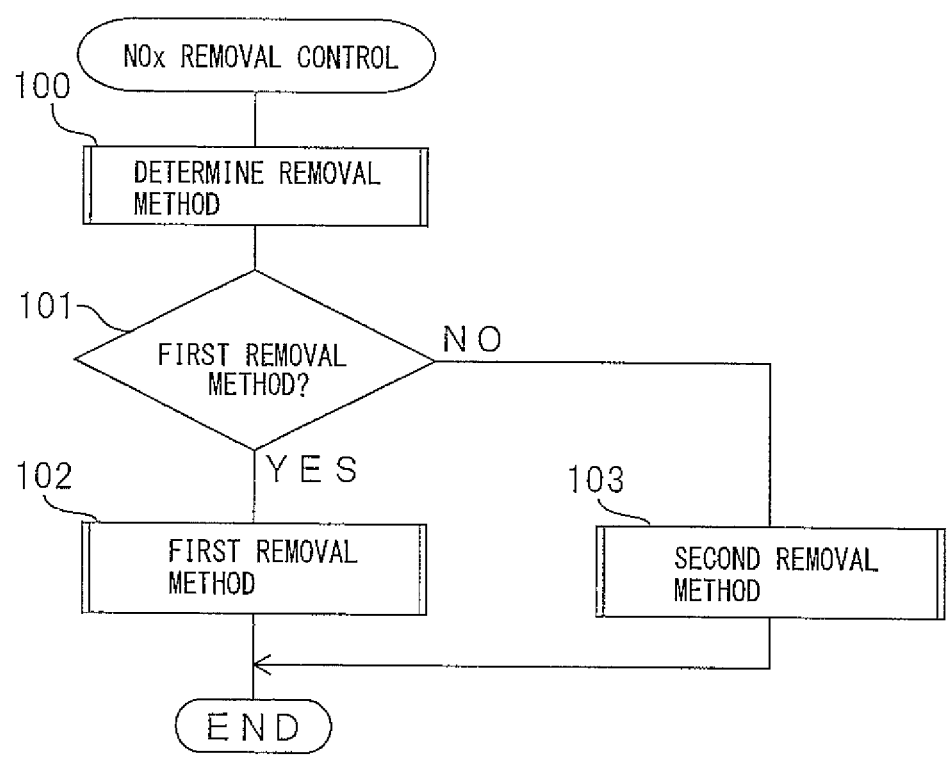
FIG. 22 is a flow chart for performing $NO_X$ removal control.

FIG. 22 shows the routine which performs $NO_X$ removal control of an embodiment according to the present invention. This routine is performed by interruption every predetermined certain period.

Figure 23:
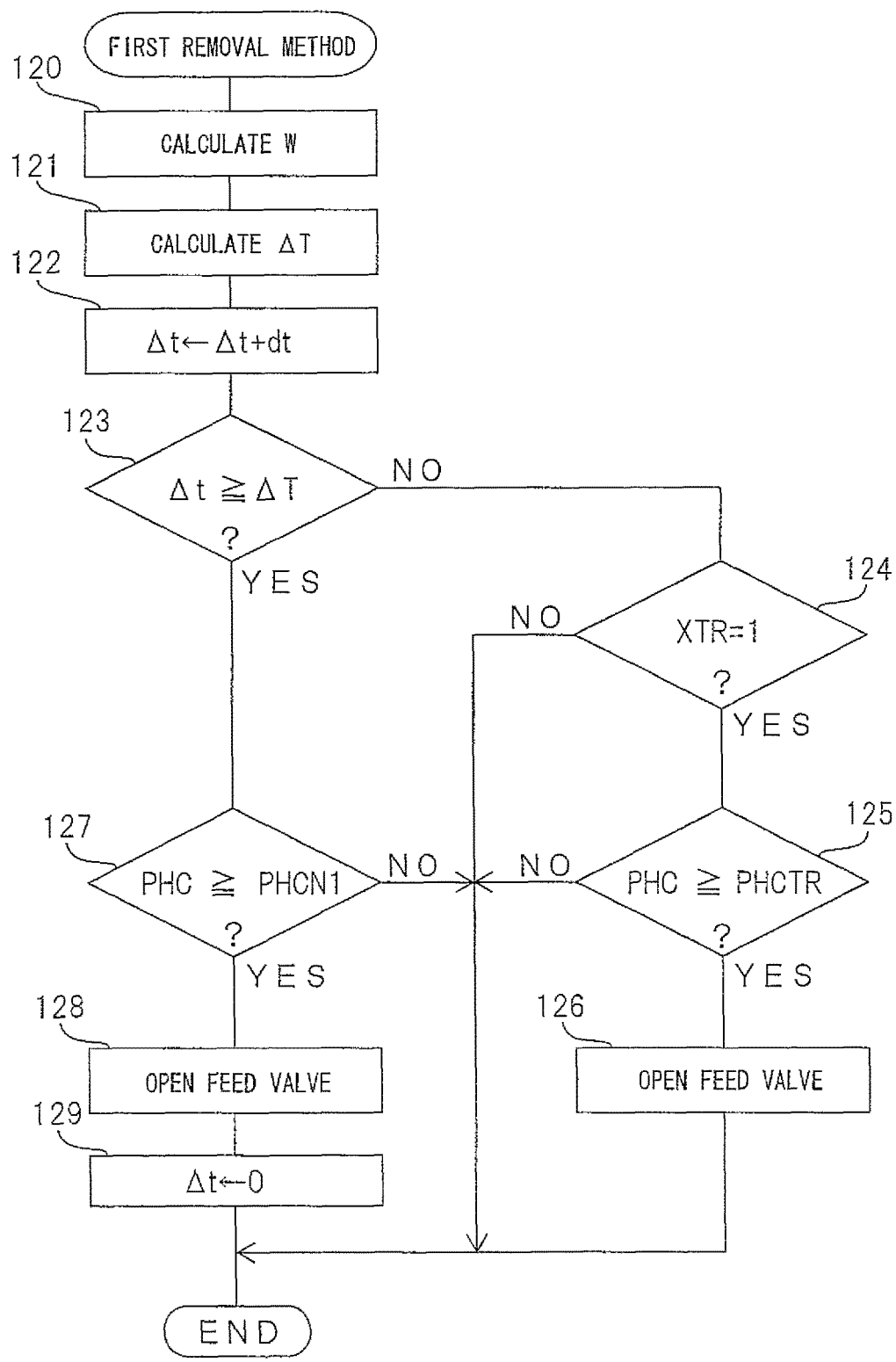
FIG. 23 is a flow chart for performing the first $NO_X$ removal method.
Figure 24:
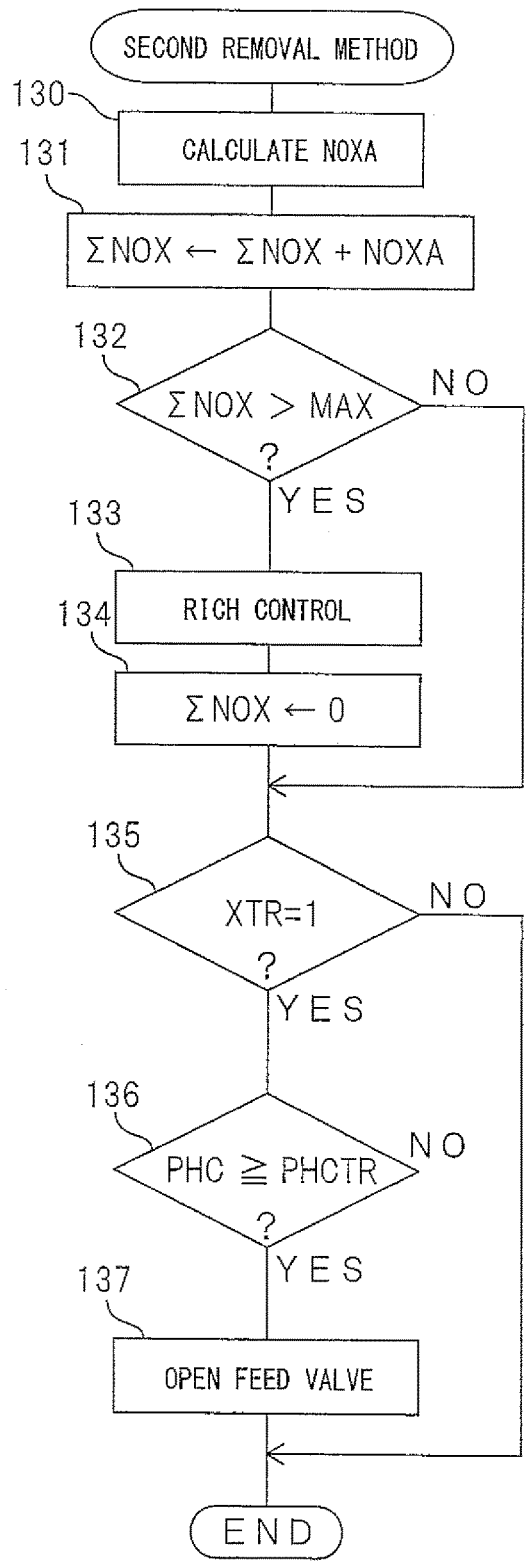
FIG. 24 is a flow chart for performing a second $NO_X$ removal method.

Referring to FIG. 22, at step 100, first it is determined which of the $NO_X$ removal action by the $NO_X$ removal method and the $NO_X$ removal action by the second $NO_X$ removal method to perform. Next, at step 101, it is judged if the $NO_X$ removal action by the first $NO_X$ removal method should be performed. When performing the $NO_X$ removal action by the first $NO_X$ removal method, the routine proceeds to step 102 where the routine for performing the first $NO_X$ removal method is performed. This routine is shown in FIG. 23. When, at step 101, the $NO_X$ removal action by the second $NO_X$ removal method should be performed, next the routine proceeds to step 103 where the routine for performing the second $NO_X$ removal method is performed. This routine is shown in FIG. 24.

FIG. 23 shows the routine for performing the first $NO_X$ removal method.

Referring to FIG. 23, at step 120, the injection amount W is calculated from FIG. 11. At the next step 121, the injection period ΔT is calculated in accordance with the engine operating state. At the next step 122, the elapsed time Δt from the previous hydrocarbon injection for the first $NO_X$ removal method is increased by a constant value dt (Δt=Δt+dt). At the next step 123, it is judged if the elapsed time Δt is the injection period ΔT or more. When Δt<ΔT, the routine proceeds to step 124 where it is judged if the flag XTR has been set. This flag XTR is set when temperature elevation control should be performed (XTR=1), while otherwise, it is reset (XTR=0). When the flag XTR is not set, that is, when temperature elevation control should not be performed, the processing cycle is ended. When the flag XTR is set, that is, when temperature elevation control should be performed, next the routine proceeds to step 125 where it is judged if the pressure PHC of the pressure storage chamber 23c is the injection pressure PHCTR for the temperature elevation control or more. When PHC<PHCTR, the processing cycle is ended. When PHC≥PHCTR, next the routine proceeds to step 126 where hydrocarbon feed valve 15 is opened for example for a certain time and therefore the hydrocarbon injection for the temperature elevation control is performed.

When at step 123 Δt≥ΔT, next the routine proceeds to step 127 where it is judged if the pressure PHC of the pressure storage chamber 23c is the injection pressure PHCN1 for the first $NO_X$ removal method or more. When PHC<PHCN1, the processing cycle is ended. When PHC≥PHCN1, next the routine proceeds to step 128 where the hydrocarbon feed valve 15 is opened for example for a certain time and therefore the hydrocarbon injection for the first $NO_X$ removal method is performed. At the next step 129, the elapsed time Δt is reset (Δt=0).

FIG. 24 shows the routine for performing the second $NO_X$ removal method.

Referring to FIG. 24, at step 130, the $NO_X$ amount NOXA which is exhausted per unit time is calculated from the map which is shown in FIG. 13. Next, at step 131, the exhausted $NO_X$ amount NOXA is added to the ΣNOX to calculate the stored $NO_X$ amount ΣNOX (ΣNOX=ΣNOX+NOXA). Next, at step 132, it is judged if the stored $NO_X$ amount ΣNOX has exceeded the allowable value MAX. When ΣNOX≤MAX, the routine jumps to step 135. When ΣNOX>MAX, the routine proceeds to step 133 where the additional fuel amount WR is calculated from the map which is shown in FIG. 15 and the action of injection of additional fuel is performed. At this time, the air-fuel ratio (A/F)in of the exhaust gas which flows into the exhaust purification catalyst 13 is made rich. Next, at step 134, ΣNOX is cleared. Next, the routine proceeds to step 135.

At step 135, it is judged if the flag XTR which is set when temperature elevation control should be performed is set or not. When the flag XTR is not set, that is, when temperature elevation control should not be performed, the processing cycle is ended. When the flag XTR is set, that is, when temperature elevation control should be performed, next the routine proceeds to step 136 where it is judged if the pressure PHC of the pressure storage chamber 23c is the injection pressure PHCTR for the temperature elevation control or more. When PHC<PHCTR, the processing cycle is ended. When PHC≥PHCTR, next the routine proceeds to step 137 where hydrocarbon feed valve 15 is opened for example for a certain time and therefore the hydrocarbon injection for the temperature elevation control is performed.

Figure 25:
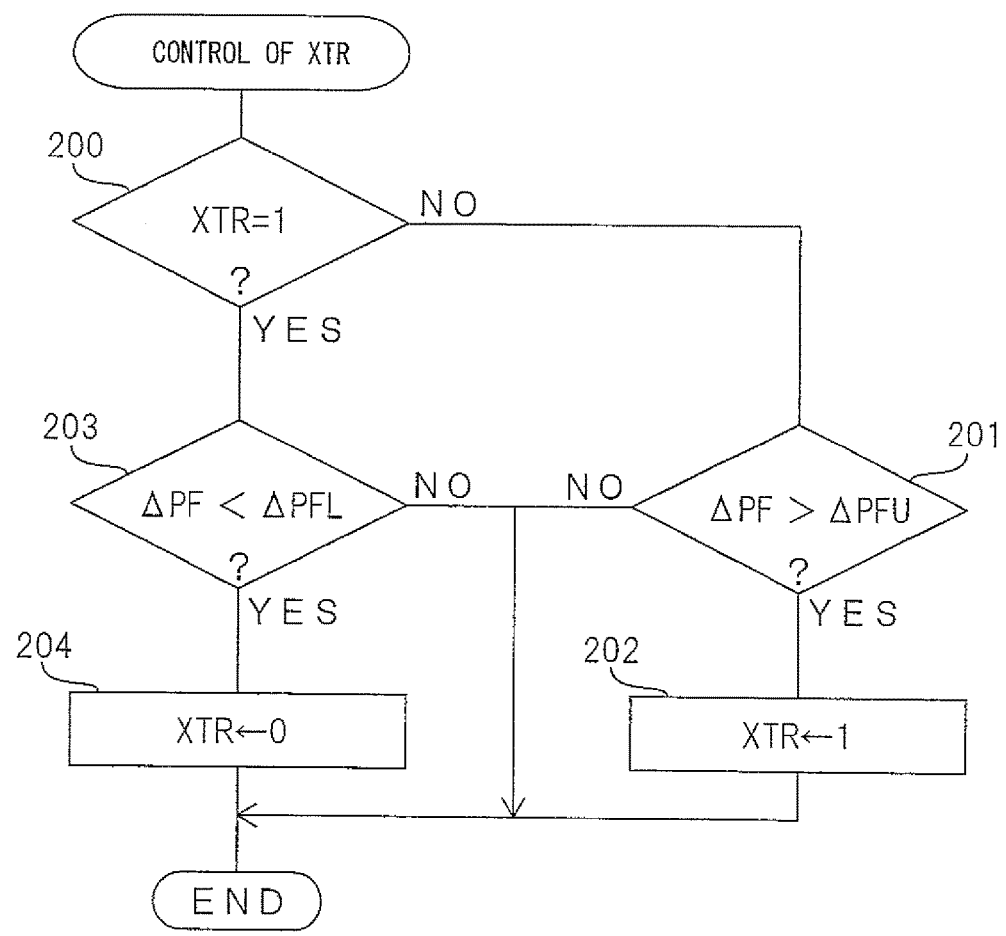
FIG. 25 is a flow chart for performing control of a flag XTR.

FIG. 25 shows the routine which controls the flag XTR. This routine is performed by interruption every predetermined constant time period.

Referring to FIG. 25, at step 200, it is judged if the flag XTR has been set. When the flag XTR has been reset, next the routine proceeds to step 201 where the differential pressure ΔPF before and after the particulate filter 14 is larger than the allowable upper limit ΔPFU. When ΔPF≤ΔPFU, the processing cycle is ended. When ΔPF>ΔPFU, next the routine proceeds to step 202 where the flag XTR is set. Therefore, temperature elevation control is performed.

When the flag XTR is set, the routine proceeds from step 200 to step 203 where it is judged if the differential pressure ΔPF before and after the particulate filter 14 is smaller than the allowable lower limit ΔPFL. When ΔPF≥ΔPFL, the processing cycle is ended. When ΔPF<ΔPFL, next the routine proceeds to step 204 where the flag XTR is reset. Therefore, the temperature elevation control is ended.

Next, another embodiment according to the present invention will be explained.

In another embodiment according to the present invention, in temperature elevation control, the target temperature of the particulate filter 14 is set to the above-mentioned predetermined set temperature or more and hydrocarbons are fed from the hydrocarbon feed valve 15 so that the temperature of the particulate filter 14 is raised up to and maintained at the target temperature. This target temperature is for example set to 650° C. Note that, the target temperature is higher than the limit temperature TX which is shown in FIG. 9.

Figure 26:
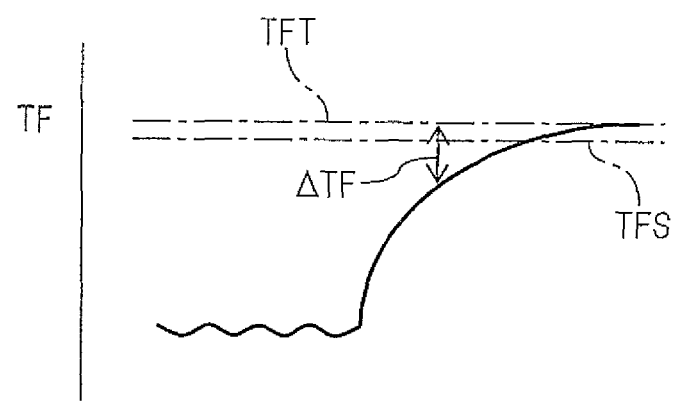
FIG. 26 is a time chart which explains a difference ATF.
Figure 27:
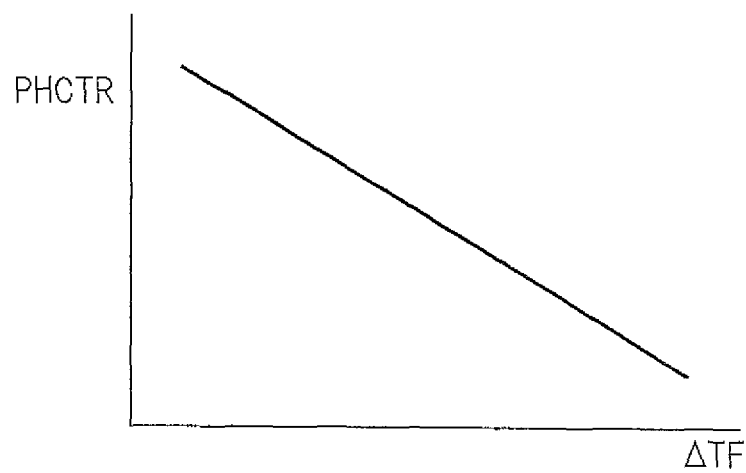
FIG. 27 is a view which shows a map of injection pressure PHCTR for temperature elevation control.

That is, as shown in FIG. 26, the difference ΔTF (=TFT−TF) of the actual temperature TF of the particulate filter 14 from the target temperature TFT is calculated. Next, the difference ΔTF is used as the basis to set the injection pressure PHCTR for the temperature elevation control. Specifically, as shown in FIG. 27, the injection pressure PHCTR for the temperature elevation control is set higher the smaller the difference ΔTF. As a result, the amount of hydrocarbons which are injected from the hydrocarbon feed valve 15 per unit time is made smaller the smaller the difference ΔTF. Therefore, the temperature TF of the particulate filter 14 is maintained at the target temperature TFT. If doing this, it is possible to keep the amount of hydrocarbons which is required for temperature elevation control small. Note that, in FIG. 26, TFS shows the above-mentioned predetermined set temperature.

Figure 28:
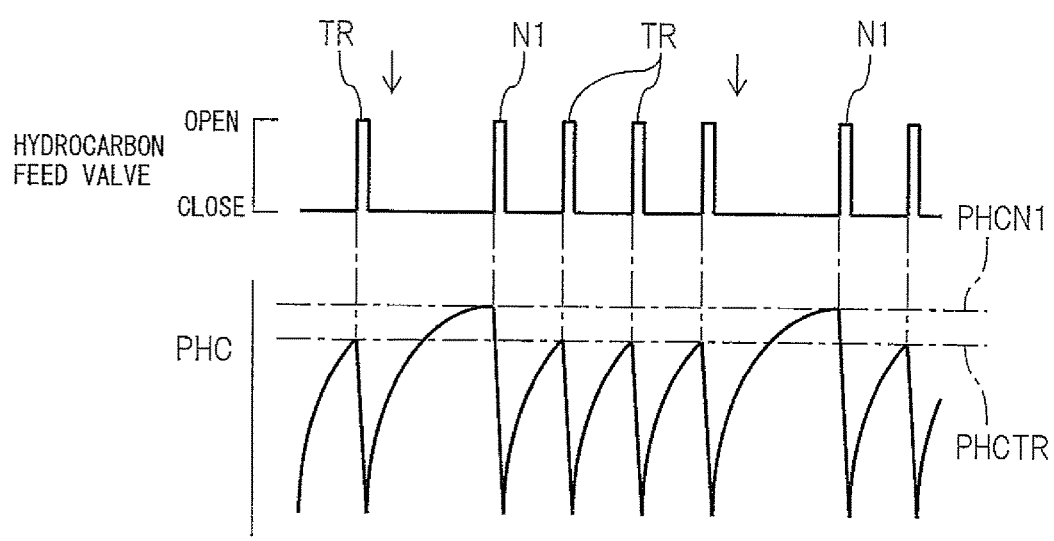
FIG. 28 is a time chart which explains a hydrocarbon injection action in the case where a first $NO_X$ removal method is performed while temperature elevation control is performed in another embodiment according to the present invention.

FIG. 28 shows the case where the injection pressure PHCTR for the temperature elevation control is set relatively high. On the other hand, FIG. 21 shows the case where the injection pressure PHCTR for the temperature elevation control is set relatively low. Referring to FIG. 21 and FIG. 28, it is also possible to view the period of the hydrocarbon injection TR for temperature elevation control as being set longer the smaller the difference ΔTF.

Figure 29:
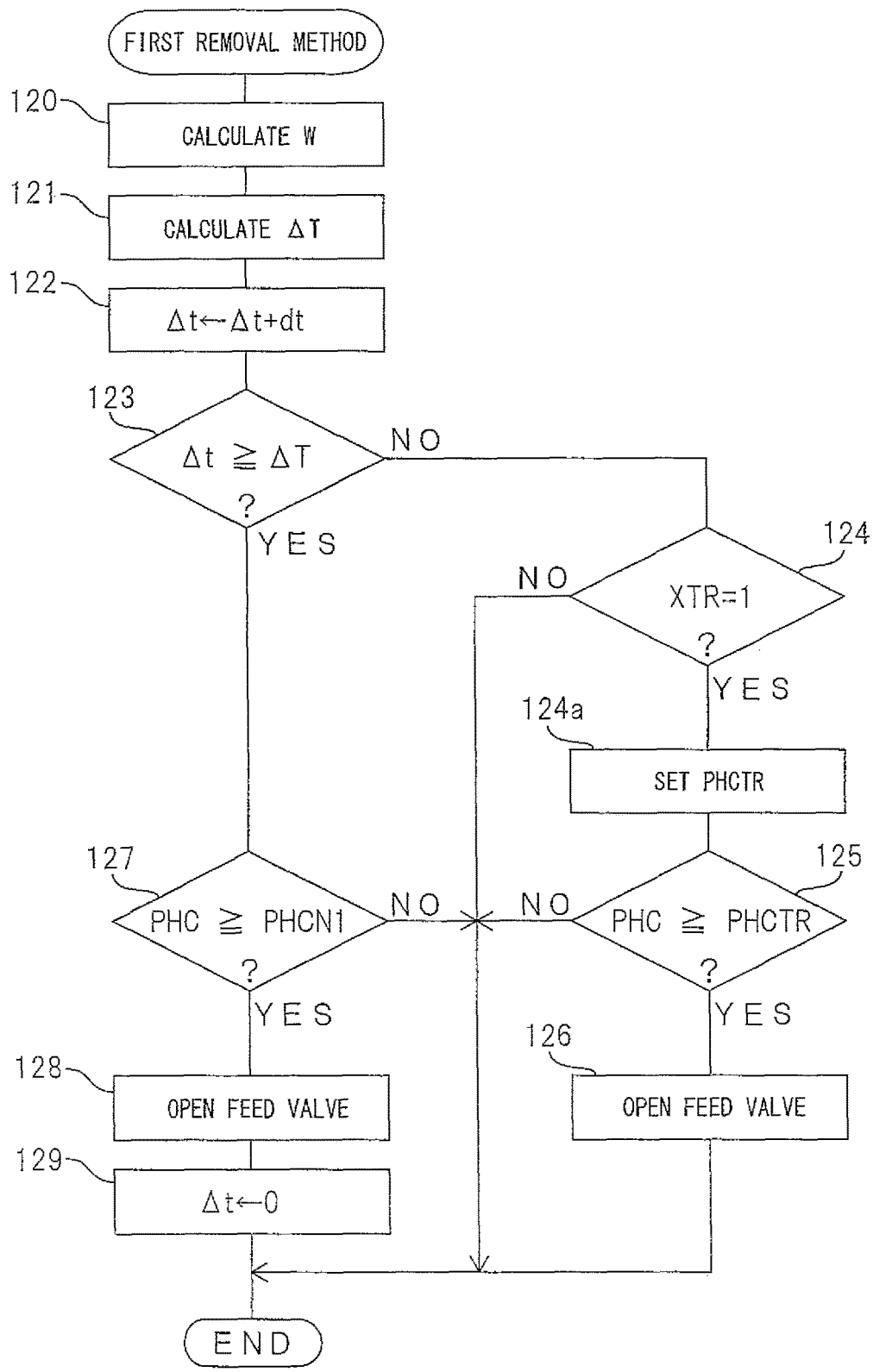
FIG. 29 is a flow chart for performing the first $NO_X$ removal method in another embodiment according to the present invention.

FIG. 29 shows the routine for performing the first $NO_X$ removal method in another embodiment according to the present invention. This routine is performed at step 102 of FIG. 22.

Referring to FIG. 29, at step 120, the injection amount W is calculated from FIG. 11. At the next step 121, the injection period ΔT is calculated in accordance with the engine operating state. At the next step 122, the elapsed time Δt from the previous hydrocarbon injection for the first $NO_X$ removal method is increased by a predetermined value dt ($\Delta t = \Delta t + dt$). At the next step 123, it is judged if the elapsed time $\Delta t$ is the injection period $\Delta T$ or more. When $\Delta t < \Delta T$, the routine proceeds to step 124 where it is judged if the flag XTR is set. This flag XTR is set when performing temperature elevation control (XTR=1). Otherwise, it is reset (XTR=0). When the flag XTR is not set, that is, when temperature elevation control should not be performed, the processing cycle is ended. When the flag XTR is set, that is, when temperature elevation control should be performed, next the routine proceeds to step 124a where the map of FIG. 27 is used to set the injection pressure PHCTR for the temperature elevation control. At the next step 125, it is judged if the pressure PHC of the pressure storage chamber 23c is the injection pressure PHCTR for the temperature elevation control or more. When PHC<PHCTR, the processing cycle is ended. When PHC≥PHCTR, next the routine proceeds to step 126 where the hydrocarbon feed valve 15 is opened for example for a certain time period and therefore hydrocarbon injection for temperature elevation control is performed.

When at step 123 $\Delta t \geq \Delta T$, next the routine proceeds to step 127 where it is judged if the pressure PHC of the pressure storage chamber 23c is the injection pressure PHCN1 for the first $NO_X$ removal method or more. When PHC<PHCN1, the processing cycle is ended. When PHC≥PHCN1, next, the routine proceeds to step 128 where the hydrocarbon feed valve 15 is for example opened for a certain time and therefore hydrocarbons are injected for the first $NO_X$ removal method. At the next step 129, the elapsed time $\Delta t$ is reset ($\Delta t=0$).

Figure 30:
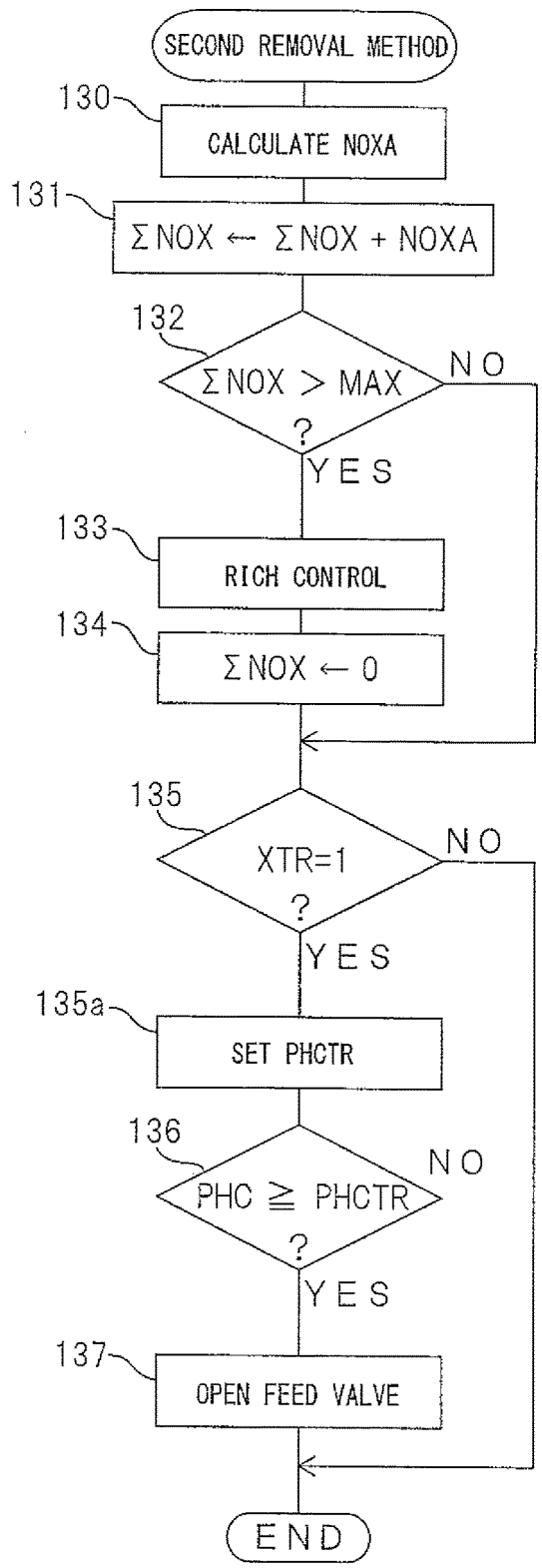
FIG. 30 is a flow chart for performing a second $NO_X$ removal method in another embodiment according to the present invention.

FIG. 30 shows the routine for performing the second $NO_X$ removal method in another embodiment according to the present invention. This routine is performed at step 103 of FIG. 22.

Referring to FIG. 30, at step 130, the $NO_X$ amount NOXA which is exhausted per unit time is calculated from the map which is shown in FIG. 13. Next, at step 131, the exhausted $NO_X$ amount NOXA is added to ΣNOX wherein the stored $NO_X$ amount ΣNOX is calculated (ΣNOX=ΣNOX+NOXA). Next, at step 132, it is judged if the stored $NO_X$ amount ΣNOX has exceeded the allowable value MAX. When ΣNOX≤MAX, the routine jumps to step 135. When ΣNOX>MAX, the routine proceeds to step 133 where the additional fuel amount WR is calculated from the map which is shown in FIG. 15 and the action of injection of additional fuel is performed. At this time, the air-fuel ratio (A/F)in of the exhaust gas which flows into the exhaust purification catalyst 13 is made rich. Next, at step 134, ΣNOX is cleared. Next, the routine proceeds to step 135.

At step 135, it is judged if the flag XTR which is set when temperature elevation control should be performed is set. When the flag XTR is not set, that is, when temperature elevation control should not be performed, the processing cycle ends. When the flag XTR is set, that is, when temperature elevation control should be performed, next the routine proceeds to step 135a where the map of FIG. 27 is used to set the injection pressure PHCTR for temperature elevation control. At the next step 136, it is judged if the pressure PHC of the pressure storage chamber 23c is the injection pressure PHCTR for temperature elevation control or more. When PHC<PHCTR, the processing cycle is ended. When PHC≥PHCTR, next the routine proceeds to step 137 where the hydrocarbon feed valve 15 is for example opened for a predetermined time and hydrocarbons are injected for temperature elevation control.

Note that, as another embodiment, upstream of the exhaust purification catalyst 13 in the engine exhaust passage, an oxidation catalyst for reforming the hydrocarbons can be arranged.

REFERENCE SIGNS LIST 4 intake manifold
5 exhaust manifold
12a, 12b exhaust pipe
13 exhaust purification catalyst
14 particulate filter
15 hydrocarbon feed valve

The invention claimed is:

1. An exhaust purification system for use with an internal combustion engine that produces exhaust gas and that has an engine exhaust passage, the exhaust purification system comprising:
   an exhaust purification catalyst arranged in the engine exhaust passage;
   a hydrocarbon feed valve and a hydrocarbon pump, the hydrocarbon feed valve being arranged upstream of the exhaust purification catalyst, the hydrocarbon feed valve and hydrocarbon pump being configured to: (i) increase the injection pressure as an elapsed time from a previous hydrocarbon injection increases, (ii) maintain the injection pressure at a maximum pressure when the injection pressure of the hydrocarbon feed valve increases to the maximum pressure, and (iii) decrease a rate of increase of the injection pressure as the elapsed time from the previous hydrocarbon injection increases;
   a particulate filter arranged in the engine exhaust passage and configured to trap particulate matter in the exhaust gas; and
   an electronic control unit programmed to:
      perform a first $NO_X$ removal method to reduce $NO_X$ contained in the exhaust gas by injecting hydrocarbons into the engine exhaust passage via the hydrocarbon feed valve in a period within a predetermined range of period;
      perform a temperature elevation control of increasing a temperature of the particulate filter so as to remove the particulate matter trapped in the particulate filter by increasing the temperature of the particulate filter to a target temperature and maintaining the temperature of the particulate filter at the target temperature; and
      when overlappingly performing the first NOx removal method and the temperature elevation control:
         inject hydrocarbons for the first NOx removal method into the engine exhaust passage via the hydrocarbon feed valve with a period within a predetermined range of period at a preset injection pressure, and
         inject hydrocarbons for the temperature elevation control into the engine exhaust passage via the hydrocarbon feed valve at a second injection pressure which is set lower than the preset injection pressure in a time period during which the hydrocarbon injection for the first NOx removal method is not performed.

2. The exhaust purification system as set forth in claim 1, wherein
   in the temperature elevation control, the temperature of the particulate filter is raised to a target temperature and maintained at the target temperature and a difference of an actual temperature of the particulate filter with respect to the target temperature is used as the basis to set the injection pressure which is set lower than the preset injection pressure.

3. The exhaust purification system as set forth in claim 2, wherein the injection pressure which is set lower than the preset injection pressure is set higher as the difference between the actual temperature of the particulate filter and the target temperature becomes smaller.

4. The exhaust purification system as set forth in claim 1, wherein the preset injection pressure is set to the maximum pressure of the hydrocarbon feed valve.

5. The exhaust purification system as set forth in claim 1, wherein the hydrocarbon injection for the first $NO_X$ removal method is performed so that the air-fuel ratio of the exhaust gas which flows into the exhaust purification catalyst is rich.

6. The exhaust purification system as set forth in claim 1, wherein the hydrocarbon injection for the temperature elevation control is performed so that the air-fuel ratio of the exhaust gas which flows into the particulate filter is lean.

7. The exhaust purification system as set forth in claim 1, wherein
the electronic control unit selectively applies the first $NO_X$ removal method and a second $NO_X$ removal method, and
the second $NO_X$ removal method includes making the air-fuel ratio of the exhaust gas which flows into the exhaust purification catalyst rich by a period longer than the predetermined range of period such that the exhaust purification catalyst releases the stored $NO_X$ and removes the $NO_X$.

8. An exhaust purification system for use with an internal combustion engine that produces exhaust gas and that has an engine exhaust passage, the exhaust purification system comprising:
an exhaust purification catalyst arranged in the engine exhaust passage;
a hydrocarbon feed valve arranged upstream of the exhaust purification catalyst;
a particulate filter arranged in the engine exhaust passage and configured to trap particulate matter in the exhaust gas; and
an electronic control unit programmed to:
perform a first $NO_X$ removal method to reduce $NO_X$ contained in the exhaust gas by injecting hydrocarbons into the engine exhaust passage via the hydrocarbon feed valve in a period within a predetermined range of period;
perform a temperature elevation control of increasing a temperature of the particulate filter so as to remove the particulate matter trapped in the particulate filter by increasing the temperature of the particulate filter to a target temperature and maintaining the temperature of the particulate filter at the target temperature; and
when overlappingly performing the first NOx removal method and the temperature elevation control:
inject hydrocarbons for the first NOx removal method into the engine exhaust passage via the hydrocarbon feed valve with a period within a predetermined range of period at a preset injection pressure,
set a second injection pressure lower than the preset injection pressure and higher as a difference between an actual temperature of the particulate filter and the target temperature becomes smaller, and
inject hydrocarbons for the temperature elevation control into the engine exhaust passage via the hydrocarbon feed valve at the second injection pressure in a time period during which the hydrocarbon injection for the first NOx removal method is not performed.

9. The exhaust purification system of an internal combustion engine as set forth in claim 8, wherein
the injection pressure of the hydrocarbon feed valve rises the longer the elapsed time from the previous hydrocarbon injection and is maintained at the maximum pressure when it is reached at the maximum pressure,
the rate of rise of the injection pressure falls the longer the elapsed time from the previous hydrocarbon injection, and
the hydrocarbon injection for temperature elevation control is performed each time the injection pressure of the hydrocarbon feed valve reaches the second injection pressure that is set lower than the preset injection pressure.

10. The exhaust purification system of an internal combustion engine as set forth in claim 9, wherein the preset injection pressure is set to the maximum pressure of the hydrocarbon feed valve.

11. The exhaust purification system of an internal combustion engine as set forth in claim 8, wherein the hydrocarbon injection for the first $NO_X$ removal method is performed so that the air-fuel ratio of the exhaust gas which flows into the exhaust purification catalyst is rich.

12. The exhaust purification system of an internal combustion engine as set forth in claim 8, wherein the hydrocarbon injection for the temperature elevation control is performed so that the air-fuel ratio of the exhaust gas which flows into the particulate filter is lean.

13. The exhaust purification system of an internal combustion engine as set forth in claim 8, wherein
the electronic control unit selectively applies the first $NO_X$ removal method and a second $NO_X$ removal method, and
the second $NO_X$ removal method includes making the air-fuel ratio of the exhaust gas which flows into the exhaust purification catalyst rich by a period longer than the predetermined range of period such that the exhaust purification catalyst releases the stored $NO_X$ and removes the $NO_X$.

14. The exhaust purification system as set forth in claim 1, wherein
a precious metal catalyst is carried on an exhaust gas flow surface of the exhaust purification catalyst and a basic exhaust gas flow surface part is formed around the precious metal catalyst.

15. The exhaust purification system as set forth in claim 8, wherein
a precious metal catalyst is carried on an exhaust gas flow surface of the exhaust purification catalyst and a basic exhaust gas flow surface part is formed around the precious metal catalyst.

16. The exhaust purification system as set forth in claim 1, wherein
the exhaust purification catalyst is configured to:
reduce $NO_X$ contained in the exhaust gas by making a concentration of hydrocarbons that flow into the exhaust purification catalyst vibrate within a predetermined range of amplitude and within the predetermined range of period, and increase a storage amount of $NO_X$ contained in the exhaust gas in response to increasing the vibration period of the hydrocarbon concentration longer than a predetermined range.

17. The exhaust purification system as set forth in claim 8, wherein the exhaust purification catalyst is configured to:
    reduce $NO_X$ contained in the exhaust gas by making a concentration of hydrocarbons that flow into the exhaust purification catalyst vibrate within a predetermined range of amplitude and within the predetermined range of period, and
    increase a storage amount of $NO_X$ contained in the exhaust gas in response to increasing the vibration period of the hydrocarbon concentration longer than a predetermined range.

* * * * *